United States Patent
Fortin

(10) Patent No.: US 6,555,047 B1
(45) Date of Patent: *Apr. 29, 2003

(54) METHOD FOR PRODUCING A BIAXIALLY ORIENTED OPEN ENDED CONTAINER

(75) Inventor: John K. Fortin, Niwot, CO (US)

(73) Assignee: Fortex, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/559,121

(22) Filed: Apr. 26, 2000

Related U.S. Application Data

(63) Continuation of application No. 08/292,692, filed on Aug. 18, 1994, now Pat. No. 6,093,364, which is a continuation-in-part of application No. 07/947,115, filed on Sep. 17, 1992, now abandoned, which is a continuation-in-part of application No. 07/578,818, filed on Sep. 6, 1990, now abandoned, which is a continuation-in-part of application No. 07/489,809, filed on Mar. 6, 1990, now abandoned, which is a continuation-in-part of application No. 07/320,699, filed on Mar. 8, 1989, now abandoned.

(51) Int. Cl.$^7$ .............................................. B29C 61/02
(52) U.S. Cl. ..................... 264/544; 264/909; 264/230; 264/235; 264/234; 264/342 R; 264/547; 264/548; 264/DIG. 71; 425/387.1
(58) Field of Search ................... 264/544, 909, 264/230, 235, 234, 342 R, 547, 548, DIG. 71, 294; 425/387.1

(56) References Cited

U.S. PATENT DOCUMENTS

| | | |
|---|---|---|
| 1,531,504 A | 3/1925 | Roberts |
| 2,784,456 A | 3/1957 | Grabenstein |
| 2,823,421 A | 2/1958 | Scarlett |
| 2,973,558 A | 3/1961 | Stratton, Jr. |
| 2,990,581 A | 7/1961 | Rowe, Jr. |
| 3,182,355 A | 5/1965 | Arnaudin |
| 3,244,780 A | 4/1966 | Levey |
| 3,412,188 A | 11/1968 | Seefluth |
| 3,439,380 A | 4/1969 | Seefluth |
| 3,499,188 A | 3/1970 | Johnson |
| 3,532,786 A | 10/1970 | Coffman |
| 3,546,746 A | 12/1970 | Johnson |
| 3,606,958 A | 9/1971 | Coffman |
| 3,642,415 A | 2/1972 | Johnson |
| 3,662,049 A | 5/1972 | Gilbert |
| 3,687,594 A | 8/1972 | Mendendorp |

(List continued on next page.)

FOREIGN PATENT DOCUMENTS

| | | |
|---|---|---|
| AU | 209544 | 7/1957 |
| EP | 1136613 | 12/1968 |
| EP | 155763 A | 2/1984 |
| GB | 474001 | 11/1937 |
| GB | 991830 | 5/1965 |
| JP | 49-28027 | 7/1974 |
| JP | 56-164817 | 12/1981 |
| JP | 62-284723 | 6/1986 |
| JP | 62-284724 | 6/1986 |
| JP | 59-078824 | 11/1991 |

OTHER PUBLICATIONS

Plastics Engineering Handbook, Thermoforming Plastic Film and Sheet, pp. 274–275, 1976.

Primary Examiner—Jan H. Silbaugh
Assistant Examiner—Edmund H. Lee
(74) Attorney, Agent, or Firm—Swanson & Bratschun LLC

(57) ABSTRACT

A method for producing open-ended biaxially oriented containers includes forming a biaxially oriented intermediate by blow forming, without plug assist, a sheet of unoriented thermoplastic material into a forming tube to a depth of draw sufficient for full orientation of the side walls. The blow formed intermediate is placed on a male form a predetermined size, shape, and texture. The intermediate is heated above the orientation temperature of the thermoplastic material to heat shrink the intermediate onto the surface of the male form. The formed container is then removed from the male form.

1 Claim, 10 Drawing Sheets

U.S. PATENT DOCUMENTS

| | | |
|---|---|---|
| 3,739,052 A | 6/1973 | Ayres |
| 3,746,497 A | 7/1973 | Neil |
| 3,757,718 A | 9/1973 | Johnson |
| 3,859,028 A | 1/1975 | Van Der Gaag |
| 3,995,763 A | 12/1976 | Ayres |
| 4,005,967 A | 2/1977 | Ayres |
| 4,025,594 A | 5/1977 | Agrawal |
| 4,045,530 A | 8/1977 | Reiber |
| 4,108,937 A | 8/1978 | Martineu |
| 4,116,606 A | 9/1978 | Valyi |
| 4,177,239 A | 12/1979 | Gittner et al. |
| 4,233,022 A | 11/1980 | Brady |
| 4,260,567 A | 4/1981 | Poppe et al. |
| 4,264,558 A | 4/1981 | Jacobsen |
| 4,293,520 A | 10/1981 | Akutsu |
| 4,298,331 A | 11/1981 | Mueller |
| 4,311,660 A | 1/1982 | Barham et al. |
| 4,315,725 A | 2/1982 | Yoshino |
| 4,330,579 A | 5/1982 | Ota et al. |
| 4,358,492 A | 11/1982 | Perkins |
| 4,375,442 A | 3/1983 | Ota et al. |
| 4,379,099 A | 4/1983 | Ota et al. |
| 4,380,526 A | 4/1983 | Agrawal |
| 4,381,279 A | 4/1983 | Jakobsen et al. |
| 4,388,356 A | 6/1983 | Hrivnak et al. |
| 4,405,546 A | 9/1983 | Jakobsen et al. |
| 4,406,854 A | 9/1983 | Yoshino |
| 4,420,454 A | 12/1983 | Kawaguchi et al. |
| 4,469,270 A | 9/1984 | Gartland |
| 4,476,084 A | 10/1984 | Takada et al. |
| 4,524,045 A | 6/1985 | Hayashi et al. |
| 4,563,325 A | 1/1986 | Coffman |
| 4,572,811 A | 2/1986 | Ota et al. |
| 4,582,665 A | 4/1986 | Jabarin |
| 4,587,075 A | 5/1986 | Butcher et al. |
| 4,589,559 A | 5/1986 | Hayashi et al. |
| 4,590,021 A | 5/1986 | Ota et al. |
| 4,697,718 A | 10/1987 | Butcher et al. |
| 4,711,624 A | 12/1987 | Watson |
| 4,810,457 A | 3/1989 | Kersting |
| 4,836,971 A | 6/1989 | Denis et al. |
| 4,878,826 A | 11/1989 | Wendt |
| 4,927,680 A | 5/1990 | Collette et al. |
| 4,933,135 A | 6/1990 | Horwege et al. |
| 4,943,406 A | 7/1990 | Bocchi |
| 5,145,632 A | 9/1992 | Denis et al. |
| 5,178,816 A | 1/1993 | Suzuki et al. |
| 5,198,176 A * | 3/1993 | Fortin .................. 264/522 |
| 5,229,042 A | 7/1993 | Denis et al. |
| 5,248,533 A | 9/1993 | Sugiura et al. |
| 5,260,005 A | 11/1993 | Ishigaki et al. |
| 5,261,545 A | 11/1993 | Ota et al. |
| 6,093,364 A * | 7/2000 | Fortin .................. 264/544 |

* cited by examiner

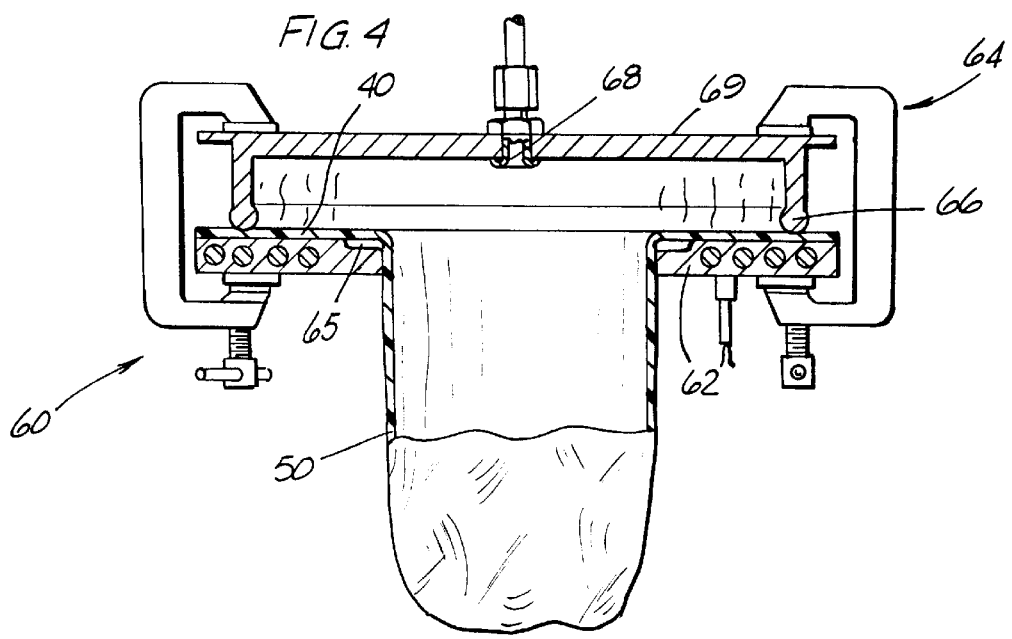
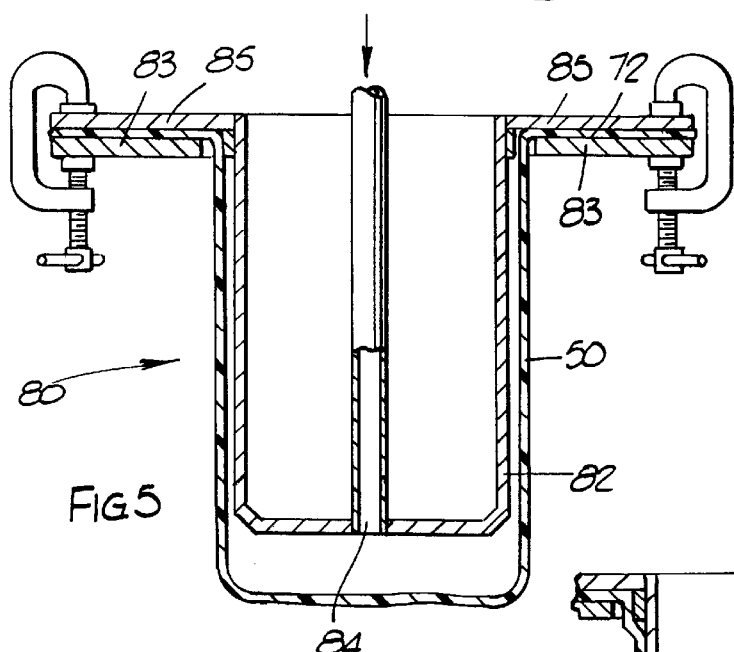
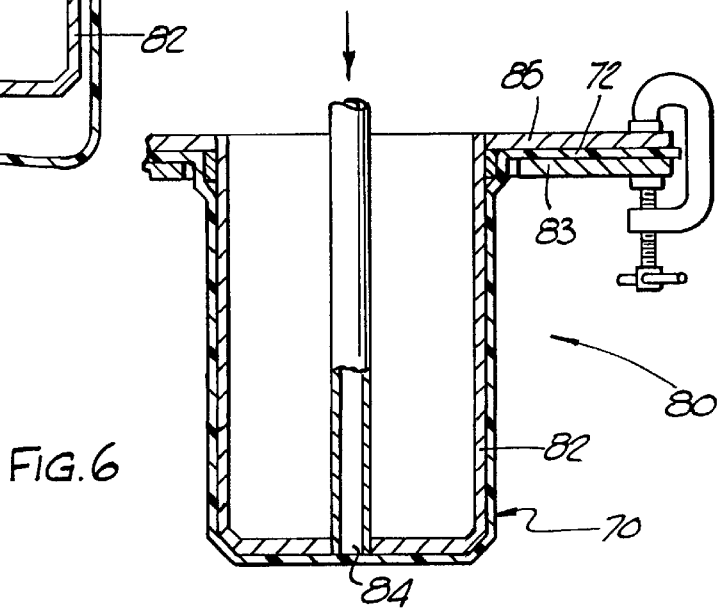

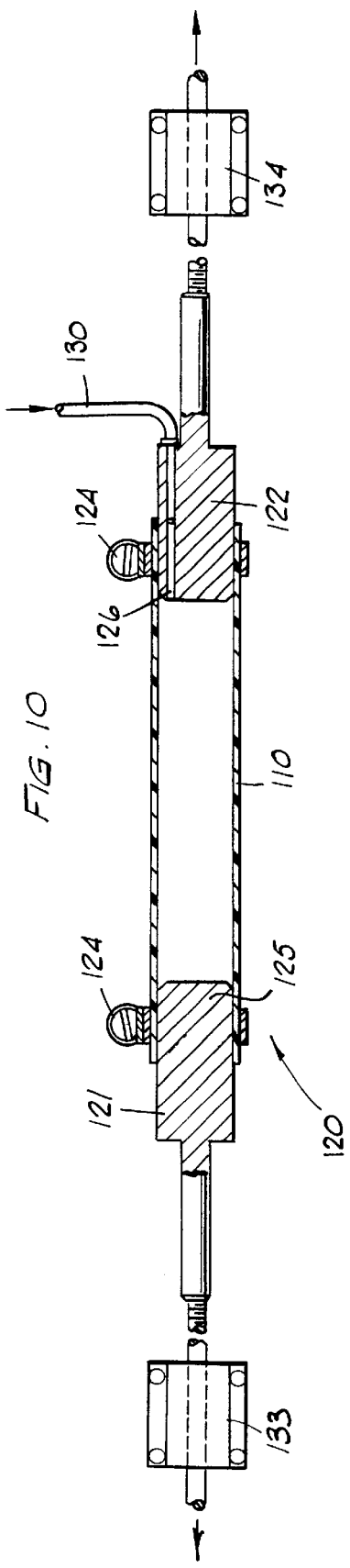
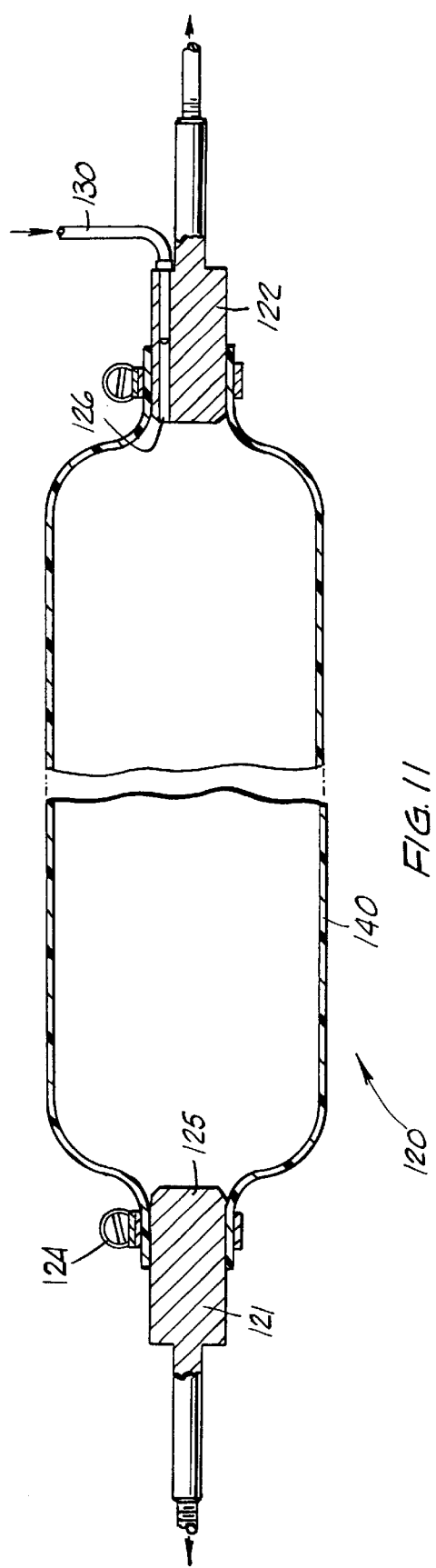

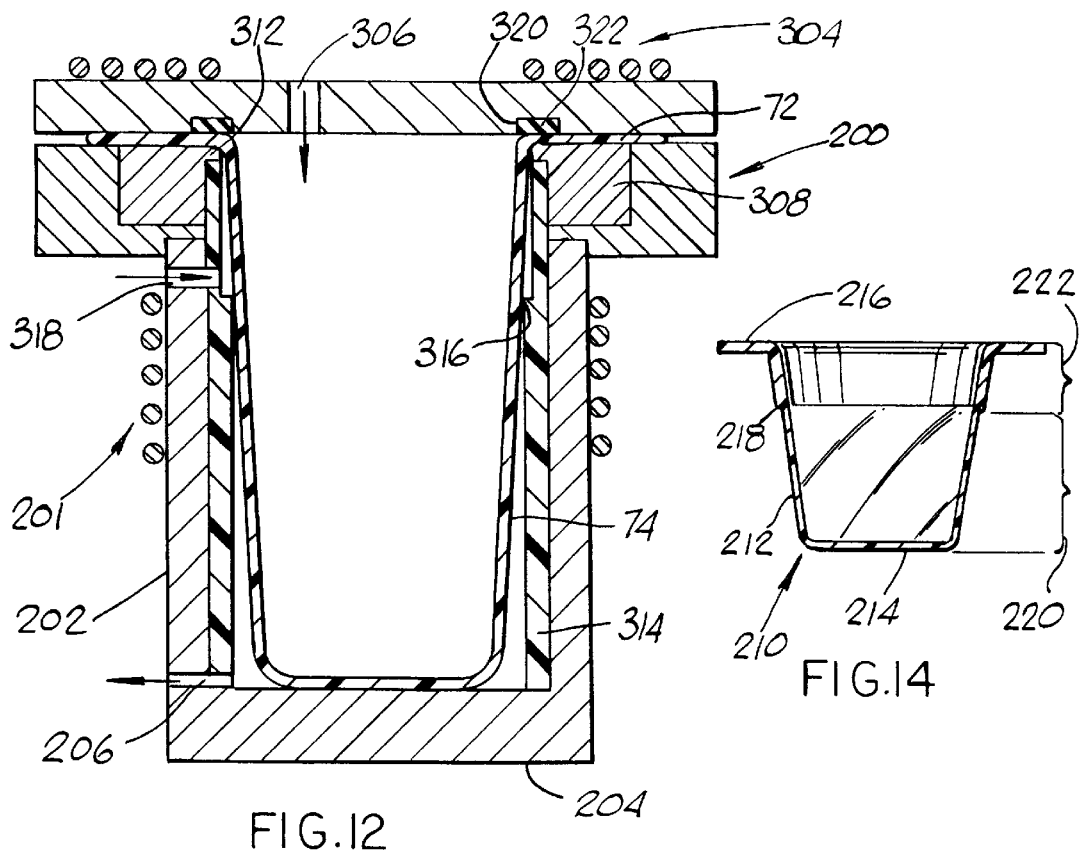
FIG. 12
FIG. 14
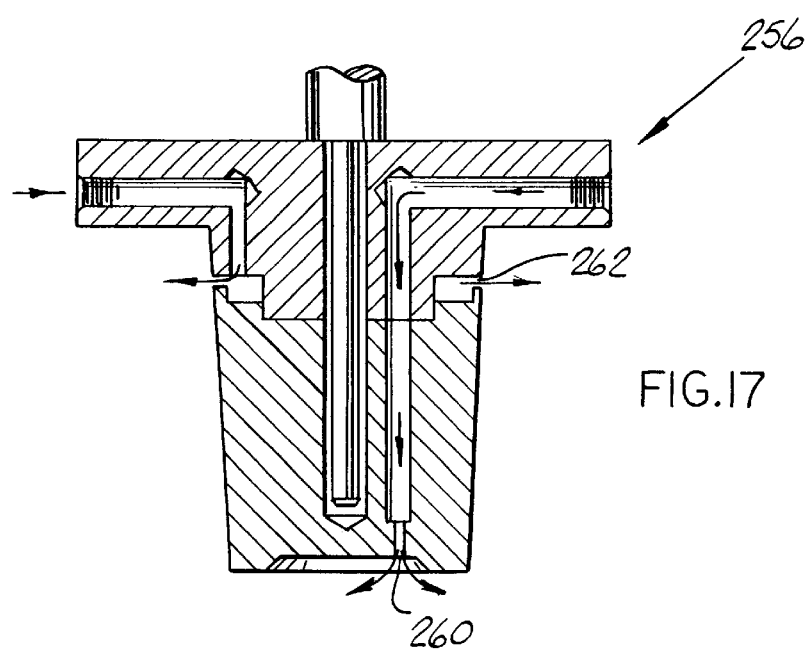
FIG. 17

METHOD FOR PRODUCING A BIAXIALLY ORIENTED OPEN ENDED CONTAINER

CROSS-REFERENCE TO RELATED APPLICATION

This application is a continuation of application Ser. No. 08/292,692, filed Aug. 18, 1994 now U.S. Pat. No. 6,093,364, which is a continuation-in-part of application Ser. No. 07/947,115, filed Sep. 17, 1992 now abandoned, which is a continuation-in-part of application Ser. No. 07/578,818 filed Sep. 6, 1990 now abandoned, which is a continuation-in-part of Ser. No. 07/489,809 filed Mar. 6, 1990 now abandoned, which is a continuation-in-part of Ser. No. 07/320,699 filed Mar. 8, 1989, now abandoned, for "Method and Apparatus for the Manufacture of Shaped Products of Biaxially Oriented Polymeric Material."

FIELD OF THE INVENTION

The present invention relates to an improved apparatus and method for forming polyethylene terephthalate container-shaped or tubular articles with flat surfaces or sharply defined contours, which are dimensionally stable up to relatively high temperatures and to the articles made thereby. In particular, the invention relates to tubular belts and open-ended containers having superior dimensional, thermal and optical properties.

BACKGROUND OF THE INVENTION

The prior art relating to the molecular orientation and heat-shrinking processes of thermoplastic saturated linear polymers, such as polypropylene, polyethylene or polyethylene terephthalate ("PET"), is extensive. It is well know in the art that films or tubes of unoriented thermoplastics may be heated to their orientation temperature and "stretched" in order to "orient" the linear polymeric chains. Such orientation greatly increases the strength of the material in the direction of stretching. By simultaneously or serially stretching a film of unoriented linear polymer in two directions perpendicular to each other, a material of consistent superior properties in all directions is obtained. Such products are referred to as being biaxially oriented. Biaxially oriented thermoplastics have many desireable properties including increased tensile strength and elastic modules.

There are two general categories of thermoplastics that are capable of orientation. The mono-1-olefins, such as polyethylene and polypropylene, are crystalline polymers. Other thermoplastics, most predominant among these being PET, are crystallizable polymers. Crystallizable polymers can be produced in an amorphous or non-crystalline solid state capable of being transformed into a crystalline form through heating to temperatures above the orientation temperature of the material. The length of time required to crystallize crystallizable polymers is dependent on the temperature and the degree of crystallinity required. Oriented then crystallized polymers have significantly enhanced thermal dimensional stability over crystalline polymers because of their heat-setting abilities.

The temperature employed in heat-setting a crystallizable polymer defines the maximum temperature to which the product may subsequently be heated without causing the polymer to relax toward its unoriented shape.

In the case of PET, the optimal orientation temperature range in which biaxial stretching occurs is between 80° C. and 110° C. U.S. Pat. No. 2,823,421 of Scarlett, for example, describes a method for orienting an amorphous film of PET 3.25 times its original longitudinal width at a temperature between 80°–90° C. The temperature of the film is then raised to between 95°–110° C. before it is transversely stretched. The resultant biaxially oriented film is then heat-set at a temperature in the 150°–250° C. range.

Although raising the temperature of oriented PET during heat-setting will "set" the form of the film, unless restrained by some means such as tenting frames, molds or air pressure, the film tends to shrink significantly during the heat-setting process. Oriented crystalline polymers will also shrink upon heating.

The heat-shrinking characteristics of oriented crystalline and crystallizable polymers is exploited by this invention to form products with unique characteristics. For either group of polymers, the shape an article is conformed to during heat-shrinking is maintained by the article after it is cooled to room temperature. A crystalline polymer will lose its shape when heated above its orientation temperature, while crystallizable polymers may be heat-set to temperatures above its orientation temperature but below its melting point.

Heat-shrink tubing for the insulation of electrical connections is well know in the prior art. Another example of a process used to capitalize on this property, the heat-shrinking of polyvinyl chloride, a crystalline polymer, for the purpose of placing a hard plastic coating on photoflash lamps, is described in U.S. Pat. No. 4,045,530 of Reiber. U.S. Pat. No. 2,784,456 of Grabenstein describes the use of bands of PET, a crystallizable polymer, to seal bottles containing beverages and foods by heat shrinking the bands over the bottle and cap juncture. Neither of these patents discloses the use of the heat-shrinking process in order to mold the shape of an article to be later used independent from the coated substrate.

Crystallizable polymers, such as PET, also may be heat-set in a non-oriented form. Raising the temperature of amorphous PET above its orientation temperature range will "set" the form of the object, producing a strong, hard but somewhat brittle material. Heat set unoriented PET is milky white and translucent and will retain its physical structure on heating to temperatures in the 200° to 250° C. range.

Due to the excellent strength characteristics of oriented plastics, there are a substantial number of commercially available products composed of these materials. For example, the commonly used two liter bottles of carbonated drinks are generally made of oriented PET.

Patents describing processes and apparatus for the efficient production of open ended containers made of biaxially oriented thermoplastics are numerous. See, for example, U.S. Pat. No. 4,711,624 of Watson; U.S. Pat. Nos. 4,381,279, 4,405,546 and 4,264,558 of Jakobsen; U.S. Pat. Nos. 4,563,325 and 3,532,786 of Coffman; and U.S. Pat. Nos. 3,412,188 and 3,439,380 of Seefluth.

The most frequently described method for forming containers utilizes a combination of injection molding and blow-forming. According to these procedures, a solution of molten thermoplastic is injection molded into a mold to form a parison or pre-form. Typically, the parison is removed from the injection mold and placed in or surrounded by a female mold. The temperature of the parison is brought into the orientation temperature range, at which time it is blow-molded into a female mold in order to biaxially orient the thermoplastic and give it its final shape.

There are several advantages in utilizing this two-step process. The portion of the parison that will be used as the neck of the container may be injection molded to contain intricate structure such as the ribbing required for a screw-on cap. This neck portion can be positioned so that its shape is retained during the blow-molding.

Once shaped, the blow-molded container may be cooled to room temperature to retain its shape. If a crystallizable polymer is used, the container may be heat-set to higher temperatures prior to cooling. If heat setting is desired, a positive pressure must be maintained in the container to prevent shrinkage during heating. For an example of this general type of apparatus and method see U.S. Pat. No. 4,108,937 of Martineu.

Another series of patents describes the plug-forming of thermoplastic sheets. Blow-forming a sheet requires that a sheet of thermoplastic material be clamped over a mold, heated to its orientation temperature and then conformed to the mold by the action of positive pressure. In plug-molding, a male form is used to assist in the conformational process. U.S. Pat. No. 4,420,454 of Kawaguchi describes a method of plug-molding followed by blow-molding to produce biaxially oriented containers.

A commonly employed method for the production of thermoplastic containers, particularly for use in the food industry, is referred to as thermoforming. Thermoforming is the formation of an article by manipulation of thermoplastic material at a temperature above its flow temperature but below its melt temperature.

In many of these systems, the process begins with a blank of thermoplastic material. The temperature of the blank is elevated to near its melt temperature and then forged into a disc-shaped preform. The peripheral edge of the preform is the incipient rim of the final container, which is rapidly cooled after forging while the bulk of the preform remains at an elevated temperature. The preform is then subjected to thermoforming and the thermoplastic attains the desired final shape. Preforms can also consist of sheets of thermoplastic, or may be produced by injection molding techniques.

The thermoforming step can be accomplished in a number of manners. In one variation, the thermoforming is accomplished by the introduction of a male plug that presses the malleable thermoplastic into a female mold. U.S. Pat. Nos. 3,499,188; 3,546,746; 3,642,415; and 3,757,718 of Johnson and U.S. Pat. Nos. 3,532,786 and 3,606,958 of Coffman, each of which is assigned to Shell Oil Company describe the plug molding variation of thermoforming.

In other variations of thermoforming, the deformation of the malleable thermoplastic is accomplished by either increasing the fluid pressure on the side of the preform opposite a female mold, or decreasing the fluid pressure in the area between the preform and the interior of the female mold, or both. It is taught that this can only be utilized when the depth of draw is minimal (e.g., when the ratio of depth of the container to the diameter of the container at the bottom is less than 1.0). See, for example, U.S. Pat. Nos. 3,739,052; 3,947,204; 3,995,763; and 4,005,967 of Ayers et al., each which is assigned to DOW Chemical Company; and U.S. Pat. No. 3,244,780 of Levey.

In a final variation on the thermoforming step, it is often desireable to combine plug molding and blow molding. Plug assisted blow molding is most often useful when a larger depth of draw is required or when the product has some unusual shape requirements. For examples of plug-assisted blow molding descriptions, see U.S. Pat. No. 3,849,028 of Van der Greg et al. and Japanese Patent publication 56-164,817 of Sumitomo Bakelite.

A final series of patents describes the combined extrusion and biaxial orientation of thermoplastic tubing. See for example U.S. Pat. No. 3,182,355 of Arnaudin, Jr.

In order to produce a thermoplastic laboratory beaker or other open-ended container that will be used to contain fluids that will be heated from the bottom, it is imperative that the bottom of the beaker or container be thin and flat. Typically, fluid containing beakers are heated on a hot plate. To enhance the transfer of heat from the hot plate to the fluid within the container, the more beaker surface contacting the plate and the thinner the walls of the bottom of the container the more efficient the heat transfer. None of the thermoplastic beakers currently available combine all of the following characteristics desireable in such a product: 1) generally chemically inert; 2) heat stable up to 250° C.; 3) flat and thin bottom; and 4) generally inexpensive to produce.

Another common problem with each of these processes is that the overall dimensions of the oriented articles is very difficult to control within exacting standards. In particular, it is extremely difficult to produce round objects with consistent diameters or non-round objects with consistent perimeter dimensions. For many purposes these variations in dimension are not significant. However, when utilizing such techniques to form seamless belts, for example (accomplished by slicing tubular sections of biaxially oriented material) close tolerances can be critical.

SUMMARY OF THE INVENTION

According to the present invention, a blow-molded, biaxially oriented thermoplastic article is heat-shrunk onto a male form. Applying the present invention to the production of can-shaped or beaker-shaped containers, it is possible to produce biaxially oriented products with extremely thin walls and a flat, thin bottom. Utilizing crystallizable polymers, the containers may also be heat-set in order to create a container with excellent thermal stability characteristics. The use of heat-shrinking of a blow molded intermediate to form the final shape of a biaxially oriented product is unique to this invention.

The process whereby the heat-shrink characteristics of biaxally oriented thermoplastics are used to create exact dimensions is not commonly seen in the prior art. Such a process enables the formation of flat surfaces, sharp contours and texture on the interior surfaces of products and has many applications for improved products and novel articles that are not currently obtainable via existing techniques.

The containers of the present invention can be made with extremely thin walls, and when coupled with the proper material may have excellent physical, optical and thermal characteristics. Such products, when made of PET, are ideally suited for use in medical, biological or chemical laboratories as inexpensive, disposable, generally chemically inert and high temperature stable beakers. The resistance to chemical attack may be increased by utilizing polypropylene, although some high temperature stability will be sacrificed. In addition, when using crystallizable polymers the containers of this invention can be made with rigid rims by heating the unoriented rim portions above the orientation temperature prior to the heat-shrinking of the rest of the beaker.

Containers may be produced according to the present invention having extremely thin, flat bottoms. The thinner the bottom surface of the container, the better the container's heat transfer properties. Beakers with very thin and flat bottoms produced of biaxially oriented crystallizable polymers according to this invention, may be used for heating or boiling liquids on a laboratory hot plate.

The containers of the present invention are extremely light weight, and in some cases—for example, when stirring highly viscous fluids—additional support may be required. The containers of the present invention may be made of sizes and shapes so that they will fit snugly within standard laboratory glassware such as beakers to provide this support.

PET containers of the present invention that will retain their shape at elevated temperatures are also desireable to the food industry. Containers in this application can either be "hot-filled" and immediately sealed, or filled with food and sealed and then raised to elevated temperatures. In either case, it is critical that the containers be able to maintain their shape at elevated temperatures.

The present invention also describes the production of seamless belts of biaxially oriented thermoplastics. Following the heat-shrinking of a tubular shaped portion of biaxially oriented thermoplastic material onto a round male form, the material may be sliced into belts of any desired width. Belts produced pursuant to this invention have an exact interior diameter corresponding to the outside diameter of the male form. According to this invention it is also possible to place ribbing or other texture on the interior surface of belts. Such belts have numerous applications in various small belt-drive systems.

The present invention includes a two step process for the production of biaxially oriented thermoplastic articles wherein either a sheet of unoriented thermoplastic material or an injection-molded preform of unoriented thermoplastic material is blow-molded into a female form creating a biaxially-oriented intermediate that is sized so that it is slightly larger than the male form used in the second step to shape the article during the heat-shrinking process.

BRIEF DESCRIPTION OF THE DRAWINGS

FIG. 4 is a cross-sectional view of the rim forming apparatus according to an embodiment of the present invention for producing containers.

FIG. 5 is a cross-sectional view of an embodiment of a container heat-shrinking apparatus of the present invention prior to the heat-shrinking process.

FIG. 6 is a view of FIG. 5 following the heat-shrinking process.

FIG. 10 is a cross-sectional view of an embodiment of a parison drawing apparatus of the present invention prior to parison drawing.

FIG. 11 is a view of FIG. 10 following parison drawing and blow-molding.

FIG. 12 is a cross-sectional view of an embodiment of an intermediate container forming apparatus.

FIG. 14 is an isometric view of a short drawn container according to an embodiment of the present invention.

FIG. 17 is a cross-sectional view of an embodiment of the heated male mold of the present invention.

DESCRIPTION OF THE PREFERRED EMBODIMENTS

Figure 1:
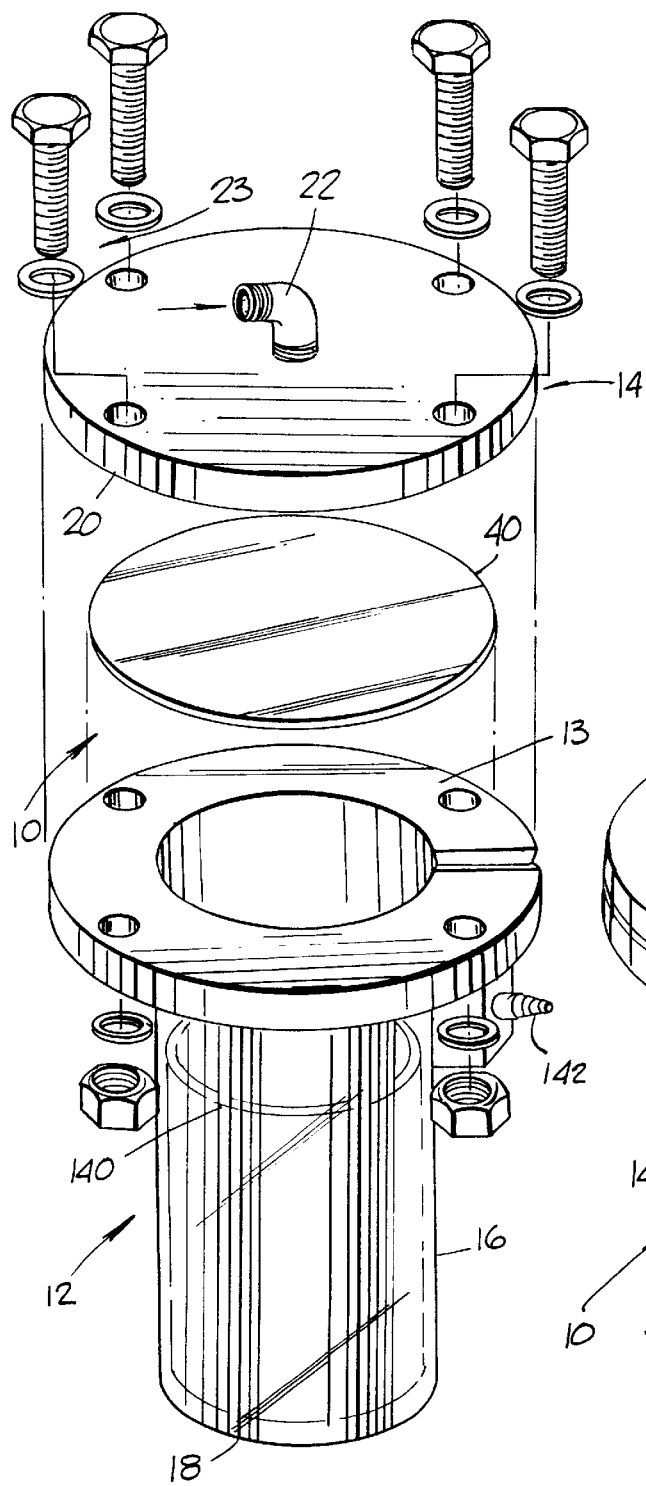
FIG. 1 is an exploded elevational view of an embodiment of an intermediate container-forming apparatus of the present invention prior to the blow-molding step.

This invention relates to methods, apparatus and final products of manufacture. The materials contemplated for use with this invention generally fall within the general category of linear thermoplastic polymer compounds. Within this general category are two more specific categories of thermoplastics; crystalline polymers and crystallizable polymers.

Crystalline polymers are those saturated linear polymers that typically only exist in a crystalline solid state. Crystalline polymers may be oriented and will heat shrink after orientation, but cannot be heat-set to "lock" their oriented shape. Examples of crystalline polymers are polymers of the mono-1-olefins such as polyethylene and polypropylene, vinylidene fluoride homopolymers, fluoropolymers such as polytetrafluoroethylene ("Teflon", which is a federally registered trademark of E.I. DuPont de Nemours, Inc.), and other similar polymer plastics.

Crystallizable polymers are those saturated linear polymers that may be produced by standard processing techniques in both amorphous and crystalline forms in the solid state. Amorphous crystallizable polymers are generally produced by rapidly cooling the molten polymer. Crystallizable polymers may crystallized or "heat set" by raising the temperature of the amorphous material above the glass transition temperature of the material. The time required to heat set the material is dependent on the temperature and the extent of crystallinity desired. By heat-setting the material it will retain its shape until it reaches approximately the highest temperature at which it was heat-set. Examples of crystallizable polymers are polyesters, polyhexamethylene adipamide, polycaprolactam, polyhexamethylene sebacamide, and other crystallizable polyesters and other similar polymer plastics.

Polyesters are resins consisting essentially of a linear saturated condensation product of at least one glycol selected from the group consisting of neopentyl glycol, cyclohexane dimethanol and aliphatic glycols of the formula $HO(CH_2)_nOH$ where n is an integer of at least 2, and at least one dicarboxylic acid having 8 to 14 carbon atoms, or reactive derivatives thereof. Examples of polyesters include homo and copolymers of polyethylene terephthalate ("PET"); poly 1,4-cyclohexane dimethanol terepthalate; polyethylene-2,6-napthalenedicarboxylic acid; polyethylene isophthalate; and polypropylene terephthalate. Representative comonomers that can be used up to a total of about 16 mole percent to reduce the crystallinity and melting point are: diethylene glycol, aliphatic dicarboxylic acids (including azelaic, sebacic, dodecanedioic acid). Furthermore, the following comonomers can be used where not present in the base polyester: 1,4-cyclohexanedicarboxylic acid; 1,3-trimethylene glycol; 1-4-tetramethylene glycol; 1,6-hexanemethylene glycol; 1-8-octamethylene glycol; 1,10-decamethylene glycol; ethylene glycol; isophthalic acid; terephthalic acid; 2,6-naphthalene dicarboxylic acid; butylene glycol; cyclohexanedimethanols; and propylene glycol. The polyesters will generally have an intrinsic viscosity of at least 0.3, preferably at least 0.5 and more preferably at least 0.65.

In addition, monomers that result in branch points can be used for improved melt strength and processability. They would include trimethylpropane, pentaerythritol, trimellitic acid, and trimesic acid. These monomers, if used, should be added at less than about 1 mole percent.

Crystallization promoter can be present in the polyester to reduce the time for crystallizing the polyester and thus to speed up the rim setting step described hereinafter. Examples of crystallization promoters include those which are derived from: (1) hydrocarbon acids containing between 7 and 54 carbon atoms or organic polymers having at least one carboxyl group attached thereto, or (2) sodium or potassium ion sources capable of reacting with carboxyl groups of the acids or polymers of (1). The crystallization promoter preferably contains the sodium and/or potassium ion source in sufficient quantity that the sodium and/or potassium concentration in the polyester is greater than 0.01 weight percent. Preferably, the crystallization promoter is derived from (1) polyalkylene terephthalate copolymers or polycycloalkylene copolymers and (1) sodium and/or potassium ion sources capable of reacting with the carboxyl group (1). Preferably the crystalization promoter is selected so as not to have an adverse affect on clarity of the containers made from the polyester resin. PET having abut 50 to 250 ppm sodium or potassium end groups is preferable. Greater amounts can be used when the thickness of the PET sheet and the heat transfer conditions in the heating of the PET sheet are such that crystallization prior to blow forming does not occur. Lesser amounts can also be used, e.g., as little as 20 ppm when a lower rate of crystallization promotion is desireable.

Long chain linear polymers are created via the polymerization of monomer units. The polymerization process leads to a relatively randomly oriented mass of intertwined chains of molecules. On a molecular level, it can be appreciated that above some temperature which is commonly called the glass transition temperature it is possible to pull on two ends of the random mass of intertwined chains in order to straighten out or "orient" many of the chains parallel to the direction of forces exerted on the mass. When such pulling is done twice in perpendicular directions, the unoriented intertwining of chains will become a much more ordered structure with perpendicularly oriented chains. This systematic orientation of chains in the material leads to materials with increased tensile strength and elastic modulus.

Following the orientation of crystallizable polymer chains, further heating acts to heat stabilize the physical form of the final product. If a sheet of PET, for example, is blow-molded at its orientation temperature—85–95° C.—and then cooled, the resultant product will retain its shape up to the glass transition temperature. If, however, the temperature of the material is raised above the glass transition or blow-molding temperature to, for example, 200° C., and if the shape of the material is maintained to prevent heat-shrinking during heating, the shape the product had at 200° C. will be retained unless it is later reheated to within a few degrees of that temperature.

The tendency of the molecular chains in oriented materials to try to relax to their unoriented positions when heated tends to "shrink" oriented thermoplastic materials. This general characteristic is often used advantageously to place heat-shrink coatings or wrappers on articles. In the present invention, the heat-shrink process is used in order to shape and form articles of biaxially oriented thermoplastic materials as they exist apart from the male form onto which they are shaped.

The present invention utilizes the tendency of oriented thermoplastic material to shrink and retain its geometric dimensions upon cooling in order to produce an article with exacting dimensions that may have flat surfaces, sharp contours or texture on its inner surface. This is accomplished by forming, via novel blow-molding processes, a biaxially oriented intermediate. This intermediate is then placed on a male form and the two jointly heated allowing for the formation of flat surfaces, sharp contours and interior texture on the final product via shrinkage of the intermediate onto the male form. For crystallizable polymers, a temperature greater than that required to simply heat-shrink the article may be employed in order to heat-set the shape for increased thermal stability.

In certain preferred embodiments of the present invention, pure polyethylene terphthalate ("PET") is utilized. In other preferred embodiments, a PET containing a nucleating agent (crystallization promoter) is utilized. Non-oriented PET containing nucleating agents will crystallize much more rapidly than pure PET, and such materials may be preferred where the crystallization of non-oriented material is a process rate limiting step. The preferred nucleated PET for use in the manufacture of containers having non-oriented crystallized rims according to this invention is PET having about 110 ppm sodium end groups and an intrinsic viscosity of about 0.85 measured as described in U.S. Pat. No. 4,753,980 of Deyrup (col. 3, lines 4–13), specifically incorporated herein by this reference. This nucleated PET was used in Example 2 presented hereafter.

Figure 2:
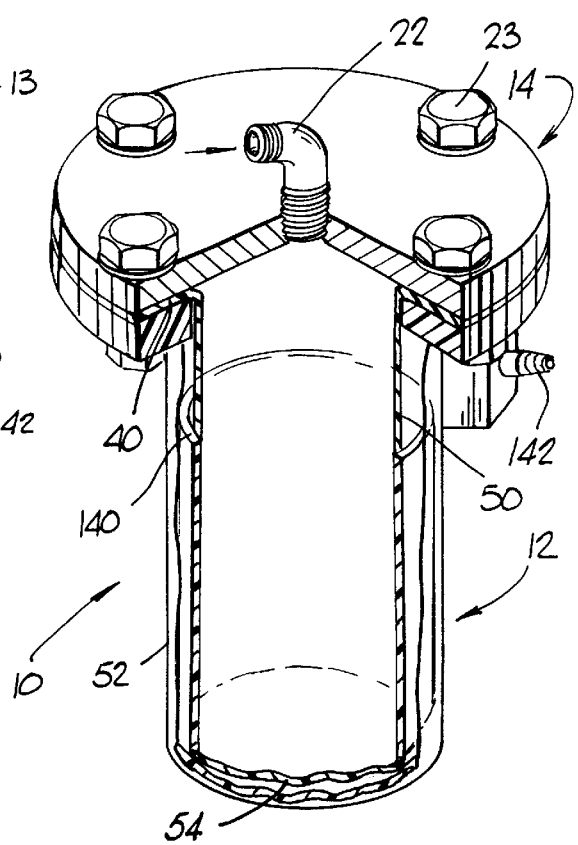
FIG. 2 is a view of the device shown in FIG. 1 at the completion of the blow-molding/orientation process.

FIGS. 1 and 2 show an apparatus 10 of the type envisioned by this invention for the production of the biaxially oriented intermediate container 50. In FIG. 1, the intermediate container forming apparatus 10 is shown. The apparatus 10 consists of a female forming tube 12, and a top clamping portion 14. The forming tube 12 consists of cylindrical side walls 16 and a bottom 18. The top clamping portion 14 consists of a flat surface 20 and a gas inlet port 22. The gas inlet port 22 is connected via conduit to a source of pressurized gas (not shown). Securing elements 23 for securing a sheet of unoriented thermoplastic material 40 between the forming tube 12 and the clamping portion 14 are required to prevent the escape of gas from the system and to prevent the sheet from being pulled into the form.

According to the present invention, the interior dimensions of the cavity of the forming tube are somewhat larger than the desired dimensions of the final product container. For example, if the final product is an open ended container having a desired outside diameter of 2.5 inches and a height of 3.75 inches, the inside diameter of the side walls 16 is 2.75 inches, and the height of the side wall 16 is 4.125 inches. Such product has been designed to fit snugly within a standard 250 mL laboratory beaker. FIG. 1 shows the apparatus 10 prior to the blow-molding process. The sheet of unoriented thermoplastic material 40, preferably having a thickness between 0.005 and 0.10 inches and most preferably about 0.015–0.060 inches thick, is held flush against the clamping portion 14 and the mouth 13 of the forming tube 12. A gasket between the two portions of the apparatus may also be desired. The apparatus and thermoplastic material are heated together to the orientation temperature of the thermoplastic material. For PET, the preferred temperature is between 70° C. and a temperature low enough such that sufficient orientation occurs to maintain transparency upon heat setting (about 110° C.). Most preferred is a temperature between 85–95° C.

In a preferred embodiment for the production of open ended containers for use as freestanding laboratory beakers, the sheet of unoriented thermoplastic material 40, preferably has a thickness between 0.005 and 0.20 inches and most preferably about 0.015 to 0.06 inches.

Throughout this specification, the sheet of thermoplastic material that is in the production of biaxially oriented intermediates is referred to as being unoriented. It should be noted, however, that the definition of unoriented does not exclude the presence of orientation which seems to inevitably be present as a result of the process for making the sheet, such as by extrusion casting of molten polymer. To the extent that the thermoplastic sheet is oriented, it must preferably be uniformly biaxially oriented, such that upon drawing in the intermediate forming step a distinct transition will be formed between the oriented body and non oriented rim. In the case of PET, this distinct transition will manifest itself as a translucent rim and transparent body in the finished container.

FIG. 2 shows the effect on the unoriented thermoplastic material 40 when pressurized gas, preferably air, is forced through the gas inlet port 22. The thermoplastic sheet "balloons" into the forming tube 12 and in so doing is subject to orienting forces in both the radial (longitudinal) and tangential directions. Of course, the extent of orientation is not consistent in all areas of the intermediate. For example, the area of the container nearest the opening of the intermediate is less oriented circumferentially than the portions of the intermediate in or near the bottom. A biaxially oriented intermediate container 50 made of PET may be produced in the time range of 0.1–120 secs. and preferably in 0.5–10 secs. A final pressure of approximately 40 p.s.i. is introduced into the cavity of the container 50, via the gas inlet port 22, to assure that a significant amount of conformation to the mold will occur. Of course, the amount of air pressure required to form an intermediate of the desired shape can vary depending on the thickness of the sheet of thermoplastic utilized. The pressure introduced via inlet port 22 is maintained for a period of time ranging from 1–60 secs. after the expansion of the thermoplastic is completed. Full extension of the intermediate into the mold will occur almost instantaneously. It may also be beneficial to place an air-outlet port (not shown) within the cavity of the forming tube 12 in order to vent or evacuate air from the cavity during the orientation process.

A characteristic of blow forming thermoplastics at their orientation temperature is that the formation of the intermediate does not occur evenly throughout the entire portion of material to be ultimately formed. Instead of all areas of the thermoplastic stretching or drawing evenly, orientation invariably begins in the middle of the sheet and proceeds outwardly with a distinct and definable line of transition between oriented and unoriented areas. When an intermediate with fully oriented side walls is desired, drawing must continue to a depth sufficient to bring the transition line all the way to the mouth of the forming tube. The minimum draw ratio (depth to diameter) to achieve this state is a function of the type of material used, and is essentially independent of the forming process (blow forming or plug forming). For PET the minimum draw ratio that will yield fully oriented side walls is about 1.3.

In a preferred embodiment of the invention, the interior of the forming tube 12 includes a thin sleeve 140 and an air inlet port 142 as seen in FIG. 2. The sleeve 140 rests on the bottom surface of the forming tube 12 and fits tightly against the interior walls of the forming tube 12. The sleeve does not extend to the top of the forming tube, but rather has a height approximately two-thirds to four-fifths of the side walls of forming tube 12. The air inlet port 142 is located on the upper side wall of the forming tube 12 in the area above the top of the sleeve 140. Air inlet port 142 is connected to a source of pressurized gas by a conduit (not shown). The sleeve 140 is preferably made of a smooth non-stick compound such as Teflon and is about 0.030 inches thick.

In order to prevent the ballooning thermoplastic sheet from sticking on the side walls of the forming tube 12, a positive air pressure is introduced into the forming tube 12 via inlet port 142 during the forming process. As the container intermediate 50 is being formed, the air introduced into the forming tube 12 forms a cylindrical pressurized area between the thermoplastic side walls and the top edge of the sleeve 140. The pressurized area at the top of the forming tube 12 helps cancel out the tendency of the thermoplastic sheet to stick to the forming tube 12 side walls at the very top, and not orient properly in that area.

The sleeve 140 serves two purposes in this embodiment. The upper edge creates the bottom seal of the pressurized area. The remainder of the sleeve being a material of low friction characteristics such as Teflon helps reduce sticking of the thermoplastic to the side wall in the bottom portions of the forming tube 12. In a preferred embodiment, the area above the Teflon sleeve may also be coated with Teflon or contain a thin Teflon sleeve.

The intermediate container 50 retains a shape generally corresponding to the interior dimensions of the forming tube 12. If the intermediate is formed at temperatures such that significant orientation occurs, no matter what air pressures are employed, upon release of the air pressure and removal of the intermediate 50 from the forming tube 12, any squared edges will be rounded, and the formed shape would not be useful for applications of the invention calling for flat bottomed containers. However, the blow molding apparatus of the present invention allows for the blow molding of products with a relatively large depth of draw (depth to diameter of greater than about 1.0; diameter referring to the diameter in the plane of the original sheet) and fully oriented side walls. For example, in a preferred embodiment of the present invention with PET, the depth of draw in the blow molding step is greater than about 1.3 (depth/diameter).

The intermediate container 50 is removed from the apparatus 10 after depressurization of the apparatus 10 and the removal of the clamping portion 14 from the forming tube 12. The can-shaped intermediate 50 has generally retained the dimensions of the interior of the forming tube 122, but will have rounded corners at the interface between the container walls 52 and bottom 54. The unoriented sheet of thermoplastic 40 remains essentially unchanged outside of the area blown into the forming tube 12.

Figure 3:
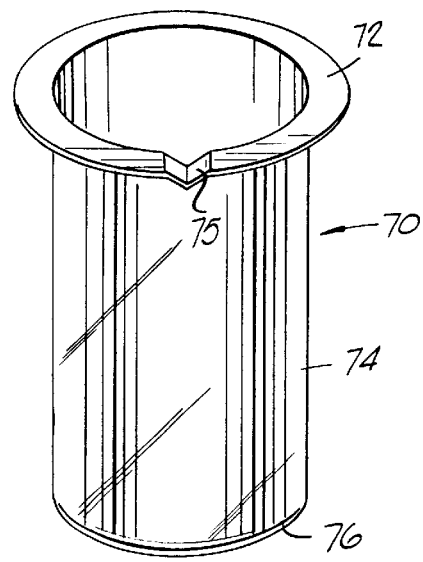
FIG. 3 is an isometric view of a container according to the present invention.

In a preferred embodiment of the present invention relating to the production of PET beaker-like containers, the final product container 70 has a flat rim-like portion 72 and thin biaxially oriented side walls 74 and bottom 76 as seen in FIG. 3. The rim portion 72 of the container 70 consists of a translucent ring of heat-set unoriented thermoplastic radiating out from the top of the side walls 74 and perpendicular to the vertical line of the side walls 74.

Many containers that preferably may be produced according to this invention will have a flat or contoured bottom and cylindrically shaped side walls. However, the invention need not be so restricted. Each of the apparatus described herein can be adapted to form containers, or a continuous upstanding sidewall, having a variety of shapes, e.g., having sidewalls that are oval, squared, bow-tie shaped or irregular in cross section. The articles produced according to these methods are open at the mouth and no neck with a reduced diameter is formed at the mouth.

The rim portion 74 serves two purposes. It acts to stiffen the side walls and entire structure of the container and it services as a lip by which the entire container, particularly when used as a laboratory beaker, may be suspended from the users fingers or from standard laboratory tongs or rings. The size of the rim is small enough that it remains aesthetically proportional to the beaker but large enough to add side wall stability and to facilitate the suspension of the container by the rim alone. Generally, these proportions create a rim dimension between 0.187 and 0.625 inches wide. The thickness is determined by the thickness of the sheet of thermoplastic initially utilized.

In another preferred embodiment of the invention, the heat-set, unoriented rim may be turned upward at an angle such that drops of liquid run back into the container instead of clinging to the rim. In such a beaker the rim may be at an angle from 20 degrees to 70 degrees from horizontal. Also, a V-shaped depression, or pouring spout, may be included to assist in the pouring of liquids from the beaker.

The side walls 74 of the final product have an increasing thickness from bottom to top. The bottom portion 76 has a generally consistent gauge that is relatively thinner than any point on the side walls 74. For use as laboratory beakers for heating liquids, the thinner the bottom the better the heat transfer properties of the container. The preferred beaker according to this invention has as thin a bottom as is possible while still being structurally usable. In any event, in the embodiment of this invention for containers to be used as beaker liners, the side walls 74 and bottom 76 are less than 0.010 inches thick. Most preferably, the side walls will be less than 0.005 inches thick, and the bottom will be less than approximately 0.0015 inches thick. The thin bottom is nevertheless strong because it has the highest orientation in the container as indicated by this being the thinnest region of the container.

In an additional preferred embodiment of a stand alone open-ended container or beaker and other container applications of the present invention, the increased thickness from bottom to top greatly enhances the use of the beaker for heating fluids on a heat source such as a laboratory hot plate. The heavier sidewalls near the rim provide sufficient stability for gripping the beaker, and the thin bottom promotes the heat transfer rate between the plate and fluid in the beaker. In this preferred embodiment the side walls and bottom are less than about 0.060 inches thick. Most preferably, in a free standing beaker and other container applications of this invention produced from a sheet of consistent gauge thermoplastic, the side walls are about 0.010 to 0.35 at their thickest point near the rim and have bottom thickness of about 0.001 to 0.020 inches. The optimal embodiment for a heatable beaker has the thinnest bottom possible to be formed in conjunction with side walls that have sufficient thickness to be structurally stable and feel solid in the hand or in laboratory tongs. In an additional embodiment, the thermoplastic sheet utilized to form the beaker may have an area of decreased thickness near the center of said sheet which, when formed, will become the beaker bottom. In this manner, the bottom thickness may be even further reduced while maintaining acceptable thickness of the beaker walls.

As mentioned previously, the thinner the beaker bottom, the better the heat transfer from the hot plate to the fluid in the container. This is also true the flatter the bottom of the beaker. The thin bottom is also valuable, in that it is flexible enough that the weight of the fluid in the beaker will help flatten the bottom and maximize surface contact with the heat source. As discussed, thick sidewalls are preferable for stiffness, and thin bottoms are preferable for rapid and even heating. So, in all preferred embodiments, the thickness of the walls at their thickness point is greater than the thickness of the bottom by a factor of at least about 1.5. In the most preferred embodiment, the wall thickness at its thickest point is at least about 2.0 times the thickness of the bottom surface of the container.

The present invention includes the method of heating fluids by introducing fluids into a container or beaker as described above, placing said beaker onto a hot plate or any other suitable source of heat and increasing the temperature of the fluid in the container. The heating or boiling of fluids in laboratory settings is required in an almost unlimited number of situations in medical, research, environmental and clinical settings.

In one embodiment of the present invention, the rim portion of the container may have a single V-shaped depression 75 to assist in the pouring of liquids out of the completed product container 70. The depression 75 is most conveniently formed in the rim setting process, by adapting the upper surface of the hot plate 62 and the adjacent surface of the clamping element 64 (see FIG. 4) to form the V-shaped depression 75 in the rim of the container. During pressurization of the intermediate the heated sheet will be forced into the V-shaped depression 77.

FIG. 4 shows a rim forming apparatus 60 that will heat-set the flat portions of the unoriented thermoplastic sheet 40 surrounding the intermediate container 50. The rim forming apparatus 60 consists of a hot plate 62 and a clamping element 64. The hot plate 62 has a circular opening that allows the intermediate container 50 to fit snugly within the opening so that all of the flat unoriented sheet 40 will contact the flat horizontal surface of the hot plate 69, a tubular or cylindrical rim 66 that sits on the upper surface of the amorphous, unoriented sheet to form an air-tight seal, and a gas inlet 68. The gas inlet 68 is associated via a conduit to an air compressor (not shown). The rim forming apparatus 60 may also be equipped with V-shaped depressions in the hot plate 62 for the heat setting of the V-shaped pouring spout.

In order to heat-set the rim portion 55 of the intermediate container 50, the container 50 is placed within the opening of the hot plate 62 and the clamping element 64 is secured in place above the hot plate 62 while holding the flat unoriented sheet 40 tightly against the hot plate. An increased pressure is maintained in the cavity of the rim forming apparatus 60 due to the introduction of gas into the system via the gas inlet 68. The increased pressure helps to assure that the unoriented sheet 40 is held flat against the hot plate 62. The surface temperature of the hot plate, is elevated above the orientation range of the thermoplastic, preferably in the 150°–250° C. range for PET.

In a preferred embodiment, the hot plate 62 of the rim forming apparatus 60 has a step-up ridge 65 surrounding the opening. The ridge has a diameter sufficiently larger than the diameter of the intermediate container 50 so that when the excess sheet is cut away from the final product 70 it will not be included on the rim 72 of the container. The presence of the step-up ridge 65 allows the rim portion to be heat-set without the formation of any wrinkles in the rim 72 by providing an area to accommodate thermal expansion of the rim during heating.

Upon cooling, release of the pressure, and removal of the intermediate container 50 from the rim forming apparatus 60, the rim portion 72 is structurally attached to the side walls of the intermediate container 50, is relatively rigid and, if PET is utilized, has a translucent appearance. In the preferred embodiment, the rim 72 is generally perpendicular to the side walls of the container 50. The stiffened rim also facilitates the final heat-shrinking operation by providing a firm surface to grip while heating.

In an alternative embodiment of the rim forming portion of the present invention, the unoriented thermoplastic may be pressed between two heated, contoured forms and held until heat set.

In certain embodiments of the present invention, it is important that the rim heat setting process be accomplished before the heat-shrinking step of the container forming process. This is indicated when the rim pulls into the sidewalls upon heat shrinking. In a preferred embodiment, the rim heat setting step and the heat shrinking step occurs simultaneously.

It is generally necessary under the present invention that the blow molding and heat shrinking steps be performed at separate stations. In the blow molding step, it is critical that temperatures be maintained within a narrow range. Since these temperatures are lower than the heat-shrinking temperatures employed, the present invention can be performed more consistently if two separate stations are employed. Although a single station apparatus—wherein very accurate temperature cycling control means would be necessary—would be feasible, it is believed that the gain in efficiencies from the elimination of a station would not compensate for the loss of efficiency in time lost and temperature control problems.

FIG. 5 shows a heat-shrinking apparatus 80 of the present invention. The apparatus 80 consists of a male form 82 and a clamping ring 83. The male form 82 is shaped according to the desired interior dimensions of the final product container 70. The form 82 may contain flat surfaces, sharp contours, texturizing, or raised or depressed printing, in order to create a logo or other markings. The portion of the male form 82 that will be in contact and give shape to the bottom of the final container product 70, is equipped with a gas exhaust port 84. The gas exhaust port 84 is associated with a source of compressed gas via a conduit (not shown).

For some configurations of the male form 82, for example when there are sharply contrasted indentations, it may be necessary to encompass the entire apparatus 80 and to provide an exterior air pressure source in order to assist the conformational process (not shown).

The clamping ring 83 consists of a ring that will fit over the container 50 and can be clamped in place in order to tightly hold the preformed rim 72 of the intermediate container 50 against the rim portion 85 of the male form 82.

The heat-shrinking process requires that the intermediate container 50 be clamped into place within the heat-shrinking apparatus 80 as shown in FIG. 5. In one embodiment, the initial temperature of the male form 82 should be as high as possible, but at or below the orientation temperature, in order to prevent the formation of localized areas of shrinkage when the intermediate 50 is being placed over the male form. When PET is used, the initial temperature may be as high as 110° C. The male form 82 and the container 50 are heated together to a temperature greater than the orientation temperature of the thermoplastic. Preferably, when utilizing PET, the temperature will be raised into the 120°–250° C. range. Most preferably, when PET is utilized the heat set/heat shrinking temperature will be in the 180° to 250° C. range. The melt temperature of PET is about 250° C. Heat setting will preferably occur for any crystallizable polymer within at least 75° C. of the melt temperature of the thermoplastic. Once the desired maximum temperature is reached, the intermediate container 50 will have conformed to the shape of the male form 82, as shown in FIG. 6, and may be immediately cooled.

Because of the dynamics of the blow forming and heat shrinking processes, there are some factors to be considered in determining the appropriate sizes of the intermediate container 50 and the male form 82. As discussed above, those areas of the intermediate container 50 closest to the opening or rim portion of the container are less oriented circumferentially than those portions in or near the bottom of the container. Consequently, the less oriented areas of the intermediate will have a lessened capacity to shrink radially and must be in closer physical proximity to the male form than the more highly oriented sections of the intermediate. At the rim juncture of the side wall, the intermediate actually fits against and in contact with the male form, while at the bottom of the intermediate, a moderate air gap may exist between the intermediate and the male form 82.

The finished container 70 and the heat-shrinking apparatus 80 is then typically cooled before removal of the container from the male form 82 is attempted. It is also preferred to reduce the temperature below the orientation temperature of the material in order to prevent any unwanted shape distortion when using air pressure to help remove the product from the male form. In the embodiment shown in FIG. 6, the removal of the container 70 is assisted by the introduction of high pressure gas through the gas exhaust port 84 of the male form 82. The introduction of a high pressure gas source to assist in the removal of the container may take any number of actual forms. For example, the male form 82 can have numerous very small exhaust ports over its entire surface. It is also possible to provide the surface of the male form with special coatings, for example Teflon, that assist in the process of removing the final product from the form. It may be desirable to place a female form over the product when "blowing" it off the male mold to help assure that the overall dimensions are not altered at this stage.

In a preferred embodiment of the present invention, the container is formed from a sheet of PET that has a uniform thickness of 0.040 inches. A beaker shaped container using this starting material will have a bottom thickness of about 0.0067±0.0002 inches. If a sheet of PET of 0.030 inches is employed, such a beaker will have a thickness of about 0.0048±0.0015 inches. Based on the various constraints of blow molding and limitations on the depths of draw that can be utilized, the minimum bottom thickness for a container of the present invention is about 1/10 of the thickness of the original sheet of thermoplastic.

The rim 72 of the final product 70 may be trimmed to the desired dimension, and the exterior surface may be painted or labeled via conventional techniques. The container 70 of a final product made of PET consists of a milky-white or translucent, heat-set, unoriented thermoplastic rim and a cylindrical wall and bottom of a thin, clear, biaxially oriented thermoplastic material. If the thermoplastic is a crystalline polymer, the container will retain its shape up to approximately the maximum temperature experienced during the heat shrinking step, which must be less than the material melting temperature. If the thermoplastic is a crystallizable polymer, the container will retain its shape up to approximately the heat-shrink/heat-set maximum temperature. In addition, the biaxially oriented sidewalls and bottom may have flat surfaces, sharp contours and texture or ribbing on its inner surface. In the case of beakers, a flat bottom increases the stability of the article and the contact area for heat transfer.

In certain embodiments of the invention, a crystallized or heat set rim is not desireable. In this case, the rim heat setting step of the formation process may be eliminated. It is also possible to form containers according to this invention that have convex rather than flat bottoms by applying a vacuum to form the bottom of the container into a concave area of the male form.

The process described above, and illustrated in FIGS. 1–6 may also be employed in the production of seamless belts of biaxially oriented thermoplastics. A container 70 produced according to the above procedure may be sliced in order to yield seamless belts of exacting dimensions.

Figure 7:
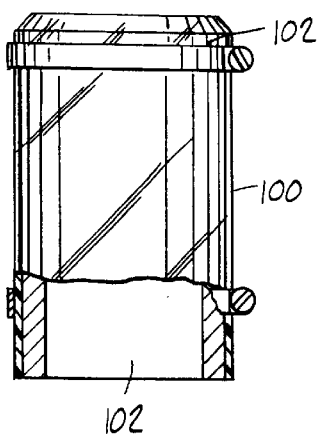
FIG. 7 is an elevational view of an embodiment of a tube heat-shrinking apparatus of the present invention.

The intermediate container 50 may be used, prior to rim formation or heat-shrinking, as the starting material for such belts. The bottom of the container and the top connected to the amorphous sheet may be removed from the intermediate 50 to produce a cylindrical tube 100 of biaxially oriented but not heat-shrunk thermoplastic. The cylindrical tube 100 is placed on a tubular male form 102 as shown in FIG. 7. The ends must be clamped down to prevent axial displacement, and the tube 100 and form 102 heated together to heat-shrink the tube according to the procedure described above. The intermediate 50 may be heat shrunk without removing the bottom or rim portion. In such a case clamping means holding the bottom portion may not be required.

After cooling, the heat-shrunk tube may be removed from the male form 102 and placed on a similar form for cutting into belts. This form may consist of an element that can be fitted onto a rotating tool and rotated at a constant speed. A multi-blade or moveable single blade cutting tool is then used to carefully cut the tube into belts of the desired width. The belts produced according to this embodiment of the invention have a consistent and exact interior diameter corresponding to the exterior diameter of the form 102 used. The form 102 may include contours, ribbing, texture or other elements that will be incorporated onto the inner surface of the belts ultimately produced.

Figure 8:
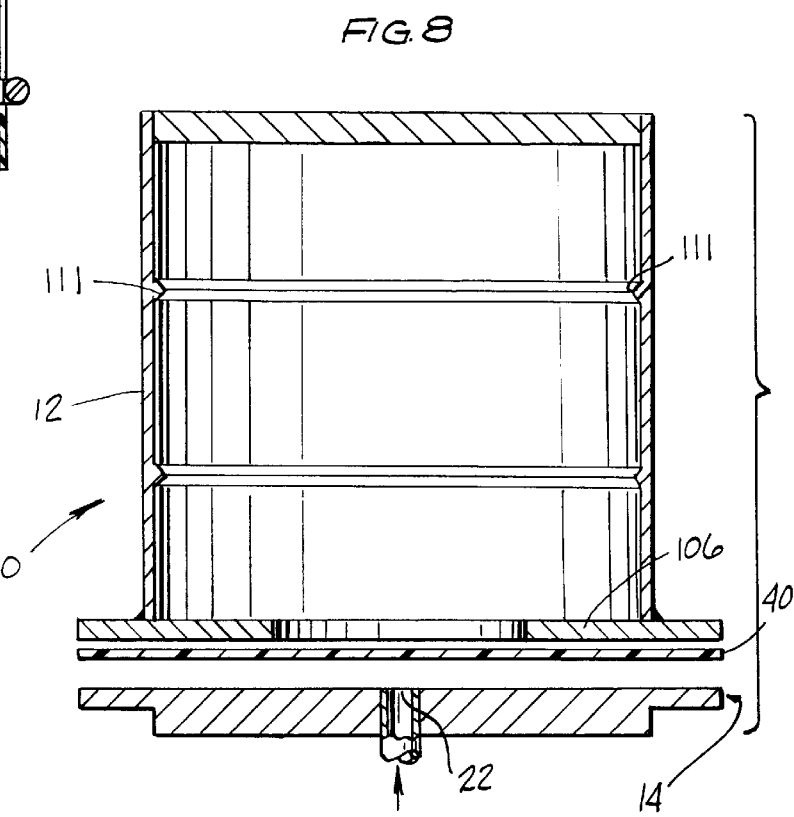
FIG. 8 is a cross-sectional view of an embodiment of a belt-forming apparatus of the present invention prior to the blow-molding step.

FIG. 8 shows an additional embodiment of the biaxially oriented intermediate container forming apparatus 10, that is specifically adapted for blow-molding belt intermediates 160 from sheets of thermoplastic material, to be used in the production of seamless belts. The forming tube 12 no longer consists of a simple open ended tube that will be "filled" by the thermoplastic "bubble" upon blowing. Rather, the opening into the cavity of the tube is restricted by a plate 106 with a circular opening. The circular opening in the plate 106 has a diameter less than the diameter of the forming tube 12. Most preferably, the circular opening has a diameter that is approximately two-thirds the diameter of the forming tube 12.

Figure 9:
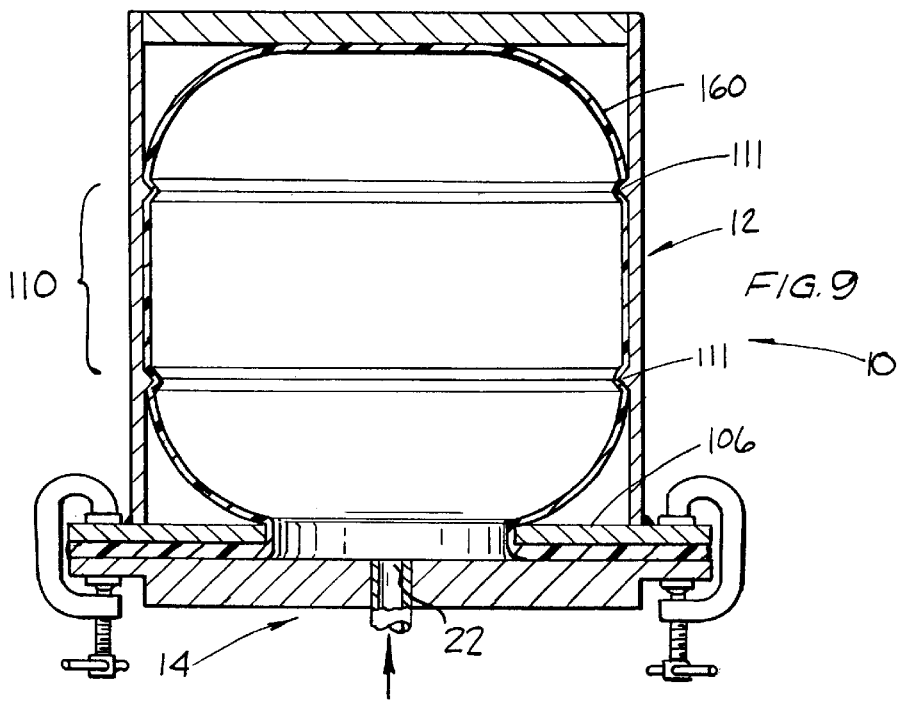
FIG. 9 is a view of FIG. 8 following the blow-molding step.

As can be seen in FIG. 9, the blow-molded, biaxially oriented belt intermediate 160 formed in this apparatus does not fill the forming tube to the extent seen when utilizing the apparatus depicted in FIGS. 1–2. That portion of the generally spherically shaped intermediate 160 that does form against the side walls of the forming tube 12 is referred to as the equatorial stripe 110. The forming tube 12 may contain ridges 111 and its interior walls in order to help differentiate the equatorial stripe from the rest of the article upon removal from the apparatus. Following the cooling and removal of the intermediate 160 from the apparatus 10, the equatorial stripe 110 may be cut from the remainder of the biaxially oriented material in order to be heat-shrunk on the device shown in FIG. 7. The seamless belt products obtained via this embodiment of the invention have two superior qualities relative to the belts produced from the previously described methods. The gauge of the thermoplastic is much more consistent when made from the equatorial stripe, and the degree of circumferential and axial orientation are more nearly equal as desired for many belt applications.

An additional embodiment for the production of biaxially oriented but not heat-shrunk belt intermediate 160 for the ultimate production of seamless biaxially oriented belts is shown in FIGS. 10 and 11. This embodiment relates to an improved means for producing seamless belts. A preform or parison of unoriented thermoplastic that has been created by well known injection molding or extrusion techniques is used to form a biaxially oriented intermediate that is then heat-shrunk.

The thermoplastic parison 110 consists of a tubular body with both ends being open. FIGS. 10 and 11 depict a blow-molding and drawing apparatus 120 according to the present invention. The apparatus 120 consists of two drawing mandrels 121, 122 and clamping elements 124. The clamping elements 124 are capable of tightly securing the ends of the parison 110 over the inwardly facing end portions 125 of the drawing mandrels 121, 122. One of the drawing mandrels, 122 in FIG. 10, is also equipped with an air inlet port 126. The air inlet port 126 is attached to a supply of pressurized gas via conduit 130.

The parison blow-molding and drawing apparatus 120 is designed so that either of the drawing mandrels 121, 122 may be moved or both simultaneously moved, in opposite directions, along centering rails 133, 134 that are positioned parallel to the axis of the parison 110. Utilizing the movable mandrels it is possible to axially "draw" the parison at the same time as it is being "blown" by the introduction of air at high pressure through the air inlet port 126.

FIG. 10 shows the parison 110 secured within the drawing apparatus 120 prior to the drawing and blow-molding process. The apparatus 120 and parison 110 are heated to the orientation temperature of the thermoplastic material utilized, and "drawn" and "blown" simultaneously. Preferably, the parison is drawn along its length to approximately 3×–5× its original length, and is blown to approximately 3×–5× its original diameter.

In order to make seamless belts that have a minimum amount of gauge variability, it is important to create a parison 110 that has a constant mass along its length. In other words, the parison should have the same quantity of thermoplastic in any cross-sectional portion along its length. Traditional injection molding techniques to form a parison require that molten plastic be injected into a cavity defined by a male and a female mold. In order to remove the male mold from the center of the formed parison, it is necessary to have a draft of 2–3 degrees in the interior of the parison. According to the present invention, each cross-sectional unit of the parison will contain identical amounts of material.

An additional female tubular form or mold (not shown) may be positioned encircling the apparatus 120 in order to physically support the biaxially oriented intermediate 140 during removal from the apparatus. The utilization of the female form will also assure that the desired extent of inflation has been uniformly attained and temperature uniformity will be maintained if radiant heat sources are nearby.

The inflated parison 140 is cooled and at least one end portion not having full diameter is removed before placing on a male form for heat-shrinking. The intermediate produced according to the process depicted in FIGS. 10 and 11 produces the preferred seamless belts of this invention due to the greatly enhanced control over the longitudinal and axial orientation of the thermoplastic and the ability to produce a more consistently gauged product.

The seamless belts of the present invention can be further modified in order to serve specialized needs. For example, in some applications it may be useful to periodically puncture holes through the belt surface. Belts altered in such a way could be used with rollers or belts having pins, the perforations in the belts capable of engaging the pins. For other applications it may be desirable to have a belt, with or without texture on the interior or exterior surfaces, made of a material with a high coefficient of friction such as urethane or other rubbers. Coating a belt of the present invention with such a material would combine the desireable qualities of this invention with the properties provided by a frictional coating.

EXAMPLE 1

The following is a detailed description of the process of the present invention employed in the production of a beaker-shaped container having a milky-white rim of heat set material. The container produced in this example is made of PET, and has the following dimensions when completed: a height (or depth) of 3.56 inches; an outside diameter of 2.25 inches near the bottom of the container and 2.69 inches near the rim; a bottom thickness of 0.0065 inches; and a sidewall thickness of 0.0065 inches near the bottom and 0.014 inches near the rim.

A blow forming apparatus 12 as shown in FIGS. 1 and 2 was used to form the intermediate container 50. The entire apparatus was preheated in an oven to 93° C. A room temperature sheet, 0.040 inches thick, of pure non-oriented PET (non-nucleated) was clamped within the blow forming apparatus 12. A moderate vacuum was applied to the sheet through port 22 to draw the sheet into thermal contact with the clamping portion 14 which is a ½ inch thick aluminum plate.

The entire assembly was placed in the oven at 93° C. for two minutes, at which time the vacuum was removed and air at a temperature of 93° C. was introduced via separate throttling valves (not shown) into ports 22 and 142. Air flow was stopped when the air pressure at port 22 reached 40 psi, or after about 2.5 seconds. Air was vented from the apparatus in about 5 seconds, and the intermediate 50 removed from the forming tube without cooling.

The intermediate container 50 has a rounded bottom with large radiused corners (about 0.75 inches radius). The diameter of the intermediate just above the bottom to sidewall radius is abut 2.5 inches and the diameter just below the opening is about 2.70 inches. The minimum bottom thickness of the intermediate 50 is about 0.0045 inches and the thickness of the side wall varies from about 0.0054 inches near the bottom to about 0.0124 inches near the top. The forming tube has an interior diameter of about 2.68 inches near the bottom and about 2.75 inches above the sleeve 140.

The rim was then heat set with a pouring spout by clamping the rim portion in an apparatus as shown in FIG. 4. The heat set plate was maintained at a temperature of 155° C. and heat setting was completed after 2.0 minutes. In this embodiment of the invention, the male form 82 of the heat shrinking apparatus was mounted to the upper heat set plate 69 and was passively in place during the rim heat setting process.

The entire rim heat set assembly was placed in a forced air oven at 245° C., and the initial form 82 temperature was 100° C. Shrinking down of the intermediate onto the male form 82 was completed within about 5 seconds, and heating was continued for an additional 5 minutes to a final male form temperature of about 200° C.

The assembly was removed from the oven and the male forms cooled to 80° C. by immersion in a bath of cooling water. Pressurized air was introduced via port 84 to assist in removal of the container from the male form.

A container, produced as described above, was filled with 200 mL of 20° C. water and set on a hot plate at a temperature of about 200° C. The water began to boil after about 4.5 minutes.

Additional Preferred Embodiments of Invention

As described above, the production of containers according to the present invention generally includes three discrete steps or stages. The three stages are: the production of the biaxially oriented intermediate container; the rim heat setting of the intermediate container; and the heat-shrinking/body setting stage where the biaxially-oriented intermediate with a heat set rim is shrunk then heat set on a male form. These three stages are generally part of the process for forming container-shaped articles such as for food containing containers or for laboratory beakers. For embodiments of the invention for containers without rims or without heat set rims, the process can be performed in two stages, with the rim heat setting step being eliminated.

Below are described additional embodiments of the apparatus that may be used in each of these stages of the process. The embodiments below are designed to allow the various stages or steps to occur in discrete locations. Where heat is required in any given step the station will be provided with heating means, and ovens will generally not be employed. FIG. 12 shows an embodiment of an apparatus used in the production of the biaxially oriented intermediate container 50. The apparatus shown in FIGS. 1 and 2 includes a female forming tube 12 that contains a thin non-stick sleeve 140 and an air inlet port 142 and a top clamping portion 20. FIG. 12 is a cross-sectional view of an additional embodiment of this apparatus. The forming tube 200 of this embodiment consists of cylindrical side walls 202, a bottom 204 and a venting port 206.

The top clamping portion 300 is designed to fit tightly against the forming tube 200, and to create an airtight seal at the mouth 302 of the forming tube 200. The top clamping portion 300 is equipped with heating elements 304 capable of maintaining the top clamping portion 300 at a given temperature that may differ from the temperature of the forming tube 200. The top clamping portion 300 is also equipped with an air inlet port 306.

The forming tube 200 is also equipped with separate heating elements 201. Utilizing this embodiment of the apparatus, the thermoplastic sheet may be transformed without the use of an oven. At the top of the forming tube 200 adjacent the mouth of the tube, there is a circular metal insert 308, such that said insert may be removed to facilitate the insertion or removal of non-stick liner 314. The metal insert 308 has a small lip 312 extending into the forming tube 200. The lip is approximately 0.02 to 0.06 inches high and extends into the forming tube to form a continuous inner diameter with the non-stick liner. The metal insert is preferably made of aluminum. The side walls of liner 314 have a step-up ridge 316 defined by a horizontal ledge dividing two regions of the forming tube having differing diameters. The non-stick surface extends up to the lower side of the lip 312. The forming tube 200 is also equipped with an air inlet 318 in the upper—larger diameter—section of the forming tube.

The step up ridge 316 is found in the top half of the forming tube 200. This embodiment acts in much the same way as that shown in FIGS. 1 and 2, wherein the existence of the air inlet port 318 and step-up ridge 316 allow the formation of a relatively deep drawn biaxially oriented intermediate.

In this embodiment of the invention, the upper clamping portion 300 is shown having a circular channel 320 that corresponds to the sealing edge 310 of the forming tube 200. The circular channel 320 holds a rubber gasket 322 that may be used to perfect the seal between the forming tube 200 and the top clamping portion 300. The existence of the gasket enhances the definition or sharpness of the break between the side walls 74 and the rim 72 of the container product ultimately formed by clamping the sheet to be formed firmly at the mouth of the forming tube. This additional sealing embodiment may be employed with any of the intermediate forming embodiments of the present invention.

In this embodiment of the present invention, the top clamping portion 300 and the female forming tube, 200, are heated separately and may be maintained at differing temperatures. In a preferred embodiment, the top clamping portion 300 is maintained at a temperature equal to that desired for the sheet forming temperature, and the forming tube 200 is maintained at a temperature lower than said forming temperature. In preferred embodiments, the top clamping portion 300 is at between 190–210° F. and the forming tube 200 is at between 180°–190° F. By reducing the temperature of the forming tube relative to that of the clamping portion, the rim portion of the intermediate will stiffen and facilitate the removal of the intermediate from the apparatus.

Figure 13:
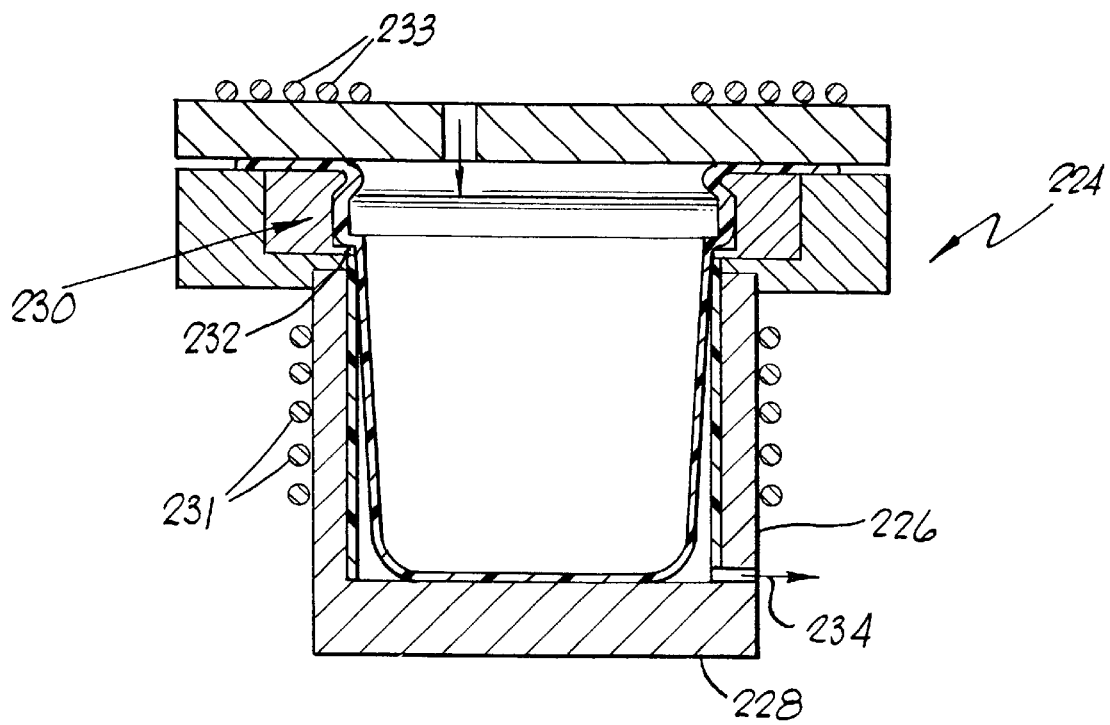
FIG. 13 is a cross-sectional view of an embodiment of an intermediate container forming apparatus for use in the production of short drawn products.

FIG. 13 shows an additional embodiment of an apparatus for the production of short drawn biaxially oriented intermediate containers. The embodiment shown in FIG. 13 is especially designed for the production of containers 210 of the type generally shown in FIG. 14.

Short drawn is defined herein as containers having a depth to diameter ratio of 0.5 to 1.2. And preferably of containers having a depth to draw of 1.0 or less. Such short drawn containers are particularly desireable for use in the food container industry. The short drawn container 210 consists of side walls 212, a bottom 214 and a rim 216. The side walls 212 contain two distinct regions. At a certain horizontal line of delineation 218, the side walls are divided into a lower, transparent, biaxially-oriented and heat set portion 220 and a upper translucent, crystallized, and heat set portion 222. The line of delineation 218 is found generally in the top 10 to 40% of the full height of the side walls 212. The bottom 214 of the short drawn container 210, like the lower portion of the side walls 220, is transparent, biaxially oriented, and heat set. The rim portion 216 of the container, like the upper portion of the side walls 222, is translucent, crystallized and heat set. The formation of such a container requires the use of especially designed embodiments of the intermediate forming and rim setting apparatus as described below.

As described above, FIG. 13 shows an embodiment of the female forming tube portion of the intermediate forming apparatus as shown in FIGS. 1, 2 and 12. This female forming tube 224 consists of cylindrical side walls 226, a bottom 228 and a venting port 234. The side walls 226, near the mouth of the forming tube 224, is distinguished by an undercut area 230. The undercut area 230 consists of a horizontal band with an increased diameter relative to the bulk of the forming tube. The undercut area 230, is preferably bare aluminum. Below this bare aluminum area, the rest of the side walls are coated with a non-stick material or include a liner of a non-stick material such as Teflon.

FIG. 13 shows the forming tube including a fully formed short drawn biaxially oriented intermediate. The horizontal edge 232 at the bottom base of the undercut area 230 serves a critical function in the formation of an intermediate that can be transformed into a short drawn container 210. This embodiment is designed so that the incipient intermediate being "blown" into the forming tube 224 "catches" on the horizontal edge 232 which prevents slippage of the thermoplastic past the edge. Because of this, the thermoplastic between the mouth of the forming tube and the horizontal edge 232 undergoes essentially no orientation, and remains relatively thick. The circular portion of the thermoplastic below the horizontal edge 232 will slide along the non-stick side walls of the forming tube to form the intermediate's oriented side walls and bottom. Because much of the thermoplastic material in the body of the intermediate is not thinned and oriented, the intermediate may be blown to much shallower depths that the intermediates made in the earlier described embodiments.

As in the embodiment shown in FIG. 12, the forming tube and the upper clamping element both include heating elements, 231 and 233 respectively. In the preferred mode for the use of this embodiment of the invention, the forming tube portion 224 is heated separately from the clamping portion of the intermediate forming apparatus. In the preferred embodiment, the forming tube is held at 180–185° F. and the clamping portion is held at about 200–210° F. This combination of temperatures makes the line formed at horizontal edge 232 more distinct, which means that the line of delineation 218 on the final product will be straight and distinct.

The embodiment for producing intermediates for short drawn containers shown in FIG. 13 produces a product 210 that cannot be produced using other known techniques. In particular, the product produced using plunger forming or plug-assisted blow moldings techniques would be distinctly different in that the orientation of the side wall into the two distinct regions of this embodiment of the invention cannot be obtained. Using plunger techniques to produce a shallow drawn intermediate will yield products having fully oriented side walls and non-oriented bottoms. After heat setting, these products will have clear side walls and opaque bottoms. Standard industrial plug assisted blow molding techniques, which are done well above the orientation temperature, would yield a totally non-oriented container that will be completely translucent when heat set. Plug-assisted blow molding done at the orientation temperature would yield a container with clear sidewalls, rounded corners, and a translucent bottom upon heat setting.

The embodiment of the female forming tube shown in FIG. 13 does not include an air inlet, and operates without any friction reduction, i.e., there is no introduction of air as in the other embodiments of this invention.

Figure 15:
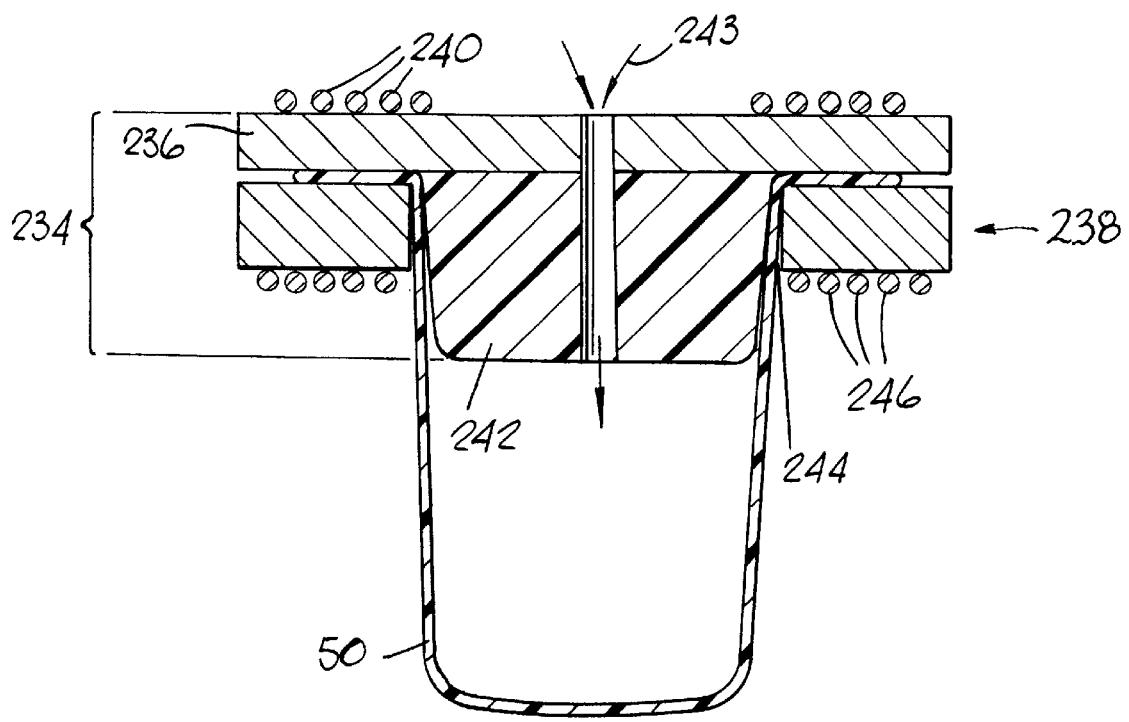
FIG. 15 is a cross-sectional view of an embodiment of the rim forming apparatus of the present invention.

FIG. 15 shows an alternate rim forming apparatus to that shown in FIG. 4. This embodiment is particularly suited for the crystallization of the non-oriented rim of the biaxially oriented intermediate of the long drawn intermediate 50 that leads to the long drawn container 70. This rim forming apparatus 234 consists of two elements; the upper clamping portion 236 and the lower plate 238. Each of the elements is separately heated and may be maintained at different temperatures. The intermediate container 50 may be placed between the two elements in order to at least partially crystalize the rim of the intermediate.

The upper clamping portion 236 includes heating elements 240 and a lower frusto-conically shaped mandrel 242 made of a low thermal conductivity non-stick material such as Teflon. The mandrel 242 serves the following functions: 1) to help center the intermediate on the apparatus; 2) to help prevent the side walls adjacent the heating elements from shrinking; and 3) to help in removing the intermediate smoothly from the upper clamping element 236. The upper clamping portion 236 also includes an air inlet port 243 capable of introducing a positive air pressure into the interior of the intermediate to remove it from the upper clamping portion 236 and mandrel 242. The lower plate 238, consists of a circular opening 244 and heating elements 246. In the preferred embodiment, both elements are maintained at about 300–400° F.

Figure 16:
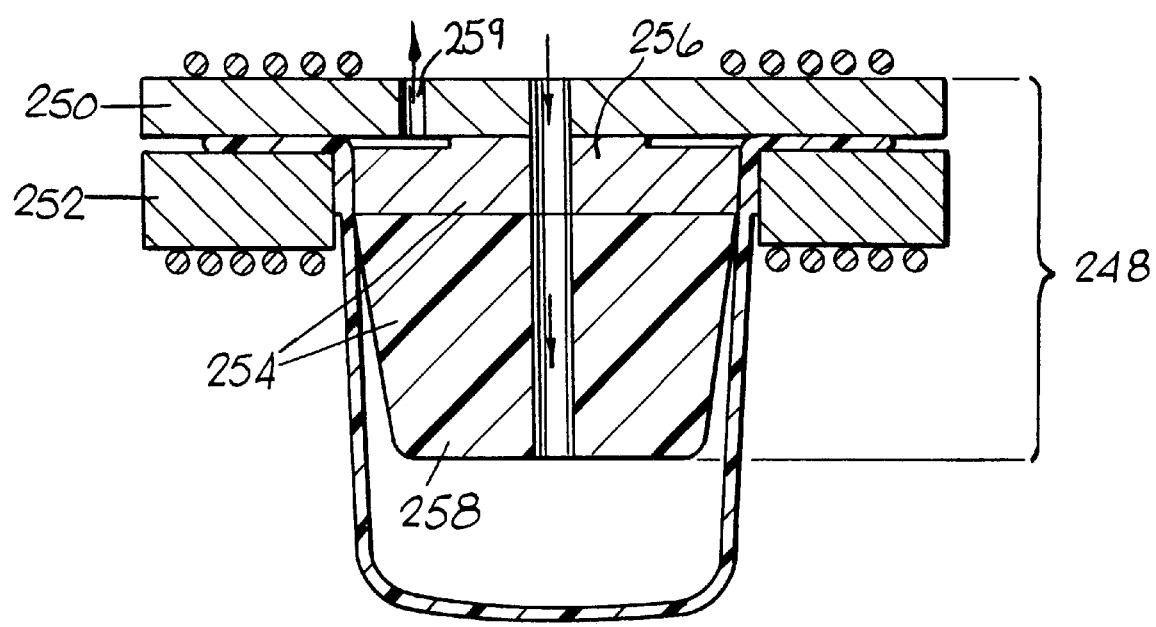
FIG. 16 is a cross-sectional view of an embodiment of the rim forming apparatus of the present invention for use in the formation of short drawn containers.

FIG. 16 shows a rim-forming apparatus for use in formation of the short drawn container 210. This rim forming apparatus 248, is to be used only with intermediates formed in the intermediate forming apparatus shown in FIG. 13. This embodiment is quite similar to that as shown in FIG. 15. Again, the rim forming apparatus 248, consists of an upper clamping element 250 and a lower plate element 252. The lower plate element 252 is identical to that used in FIG. 15.

Attached to the upper clamping plate 250, is a mandrel 254 comprised of two sections. The upper section 256, that area adjacent the bulk of the horizontal plate, is made of aluminum or other thermally conductive material. This area should extend down a distance commensurate with the thick unoriented area of the upper side wall of the intermediate formed in the apparatus shown in FIG. 13. The lower section 258 of the mandrel 254 is preferably made of a low thermal conductivity material like a high temperature plastic such as Teflon. The upper clamping element 250 also includes a port 259 ports that will allow a negative pressure to be applied between the upper clamping element 250 and the areas of the intermediate to be heat set. This allows the apparatus to assure that the horizontal rim portion and the unoriented side wall portion of the intermediate will be fully in contact with the heated aluminum areas of the upper clamping element 250 and upper section 256. In the preferred embodiment, the upper clamping element 250 is generally maintained at between 300–400° F. and the lower plate is about 200–400° F.

The time required for heat setting the rim of an intermediate using rim forming apparatus 234 or 248 is dependent on a number of factors. For example, the time is quite different if pure PET is used or nucleated PET is used. Pure PET takes longer to crystallize than nucleated PET. Under one set of temperature conditions PET takes 30 seconds where nucleated PET takes 6 seconds.

In certain embodiments of the invention the rim is not fully heat set when exiting the rim heat set apparatus. In such cases the rim setting proceeds far enough to supply sufficient rigidity to the container to withstand the forces exerted on it during the heat shrink/body set stage. The rim setting is then completed during the heat shrink/body setting stage.

In order to facilitate the speed of the heat shrinking/body setting process, a further embodiment is disclosed. The apparatus and the method employed in this embodiment can be used for either the long drawn or short drawn containers of the present invention.

The most basic element in the improved (faster) heat shrinking/body setting process is the use of a heated mandrel or male form. It was suggested in the Sumitomo Bakelite patent publication, supra, that a preheated mandrel may be used to facilitate the heat shrinking process. While the use of hot mandrel does reduce heat setting times, the use of a hot mandrel alone yields products that are unacceptable. As the biaxially oriented intermediate approaches the hot mandrel localized shrinkage occurs and the final product has serious optical imperfections in its surface. This is true even if the male mold is inserted into the intermediate very rapidly.

In this preferred embodiment of the present invention, the shortened heat shrink times available by using a hot male mold are achieved without optical imperfections. The critical new element is the introduction of air, preferably hot, forced between the intermediate and the heated male mold. If heated air is used, not only does the air hasten shrinkage of the intermediate, but more importantly, it facilitates the intermediate to shrink completely—without optical imperfections—onto the heated male mold. For PET, the temperature of the heated male mold and heated air may be as high as 440° F.

In order to further decrease the heat setting times other elements are added to the hot air/heated mold design. Included, are the introduction of hot air directed against the exterior of the intermediate, and a cooled female form, hereinafter referred to as a chill shell, for accepting the heat set and still hot and malleable container after heat shrinking/body setting.

FIG. 17 shows a cross section of one embodiment of the male mold 256 of the heated mandrel embodiment of this invention. The male mold 256 consists primarily of a form shaped to correspond to the desired inside dimensions of the final product.

Air ports 260 and 262 are found at the bottom and side of the mold respectively. The mold 256 is designed to operate to force heated air through either the bottom air port 260 and then vented out side port 262, air force air out side port 262 and vented through bottom port 260. Where the heated air should be expelled, and the pressure used, depends on the type of container being formed (long or short drawn), the thickness of the original thermoplastic sheet, the type of thermoplastic used (e.g., pure PET versus nucleated PET), and other factors. One of ordinary skill in the art may without undue experimentation determine the desired location and pressure of the heated air.

Considerations as the where to force heated air out of the male mold include the following. When the heated air is expelled through the bottom of the male mold through heated air outlet 260 and when the intermediate has at least partially shrunk around the male mold, a high pressure region exits at the bottom of the intermediate. Having this high pressure region at the bottom of the intermediate has both advantages and disadvantages. The advantage is that the material at the bottom of the intermediate is fully biaxially oriented and can withstand higher pressures without permanent deformation. The disadvantage of this arrangement is that the downward force on the container rim is maximized. This high downward force requires that the rim must be heat set sufficiently to withstand that force without distortion. In this mode, pressures measured at port 260 are typically between 10 and 50 p.s.i.

When the heated air is expelled through the sides of the heated male mold through heated air outlet 262, a high pressure region exists on the side walls of the container. The advantage of this is that the downward forces on the rim are minimized. The disadvantage is that the high pressure region acting on the intermediate side walls may permanently deform the less circumferentially oriented side walls, thus preventing them from fully shrinking against the heated male mold. In this mode, pressures measured at port 262 are typically between 0.5 and 8 p.s.i.

As described above, the desired air porting methods depends on many factors. For heat shrinking/body setting pure PET or nucleated PET short drawn containers, the preferred method is to expel heated air through heated air outlet 262, while for heat shrinking/body setting nucleated PET long drawn containers or containers without heat set rims the preferred method is to use heated air outlet 260.

As seen in the example in FIG. 17, the mold 256 may contain a recessed bottom. During the portion of the cycle where port 260 is not being used for heated air, this port may be used to create a vacuum at the bottom of the container so that the intermediate will take on the shape of the recessed bottom. At the end of the cycle, port 260 may also be used for forcing air inside the heat set container in order to remove the container from the male mold.

In FIGS. 18a–d, the male mold of FIG. 17 is shown as 256. The series of figures shows the progression and operation of the heat shrinking/body setting apparatus of this embodiment. The intermediate container 50 is shown FIG. 18a as it would be placed in the apparatus to initiate the process. The male mold 256 is moveable vertically and its motion can be controlled by any number of well known mechanisms. The chill shell 264 is held below the intermediate container 50, and is also moveable in a vertical direction.

Figure 18A:
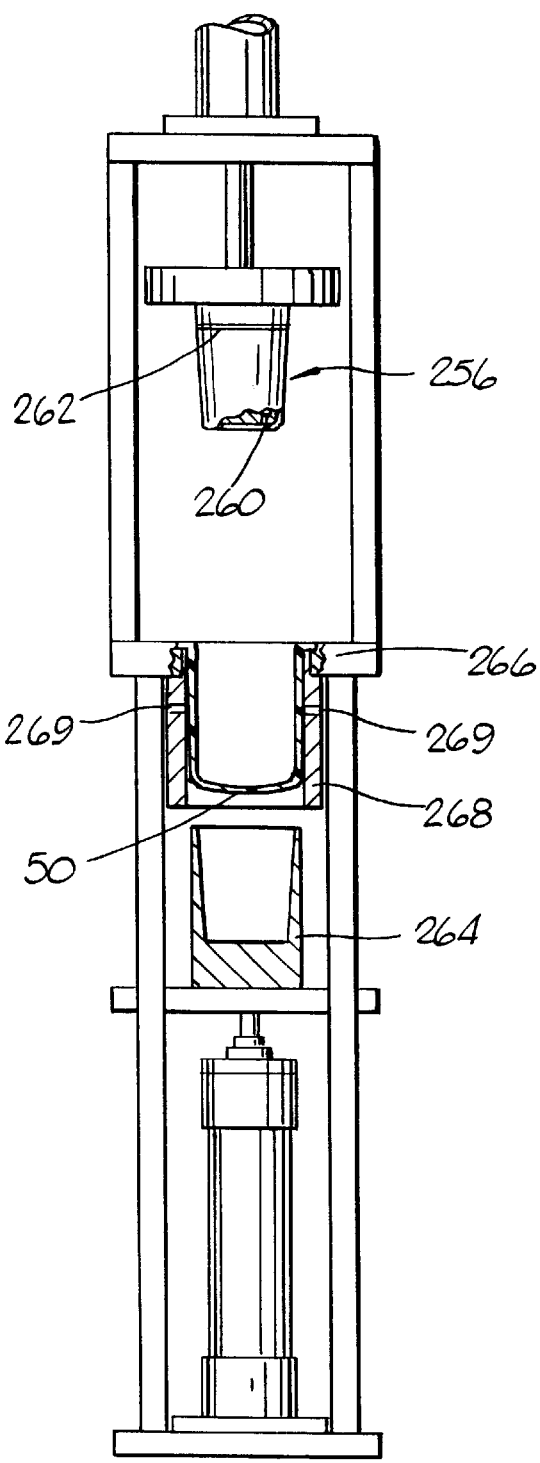
FIGS. 18A–D are cross-sectional view of an embodiment of the heat shrinking apparatus of the present invention wherein various stages of the process are shown in progression.
Figure 18B:
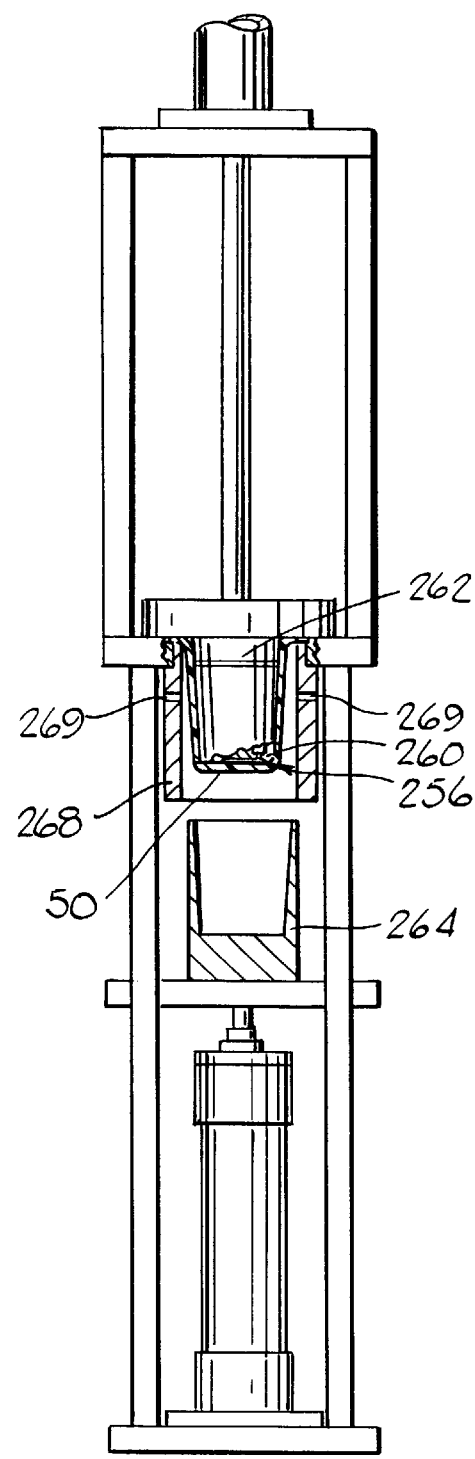

In FIG. 18a the intermediate container 50 is held in place, supported by its rim on a circular ledge 266 and generally surrounded by a heated cylindrical tube 268. Heated cylindrical tube 268 is equipped with heated air outlets 269 for forcing heated air against the exterior of the intermediate during heat setting. The first action taken by the apparatus is shown in FIG. 18b. The heated male mold 256 is inserted into the interior of the intermediate. Heated air exits the heated mandrel at either port 260 or 262, and heated air is also directed against the exterior of the intermediate through port 269. While still in the same physical configuration as in FIG. 18b, the interior heated air is removed and a vacuum is applied at port 260 if a recessed bottom is desired.

Figure 18C:
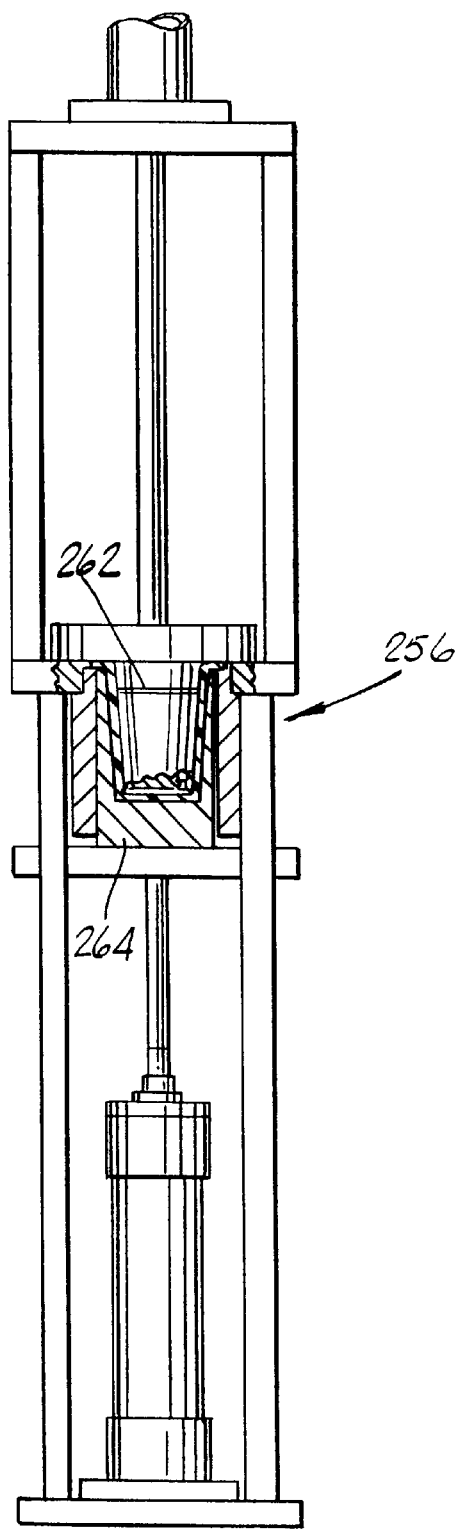

The next physical stage is shown in FIG. 18c where the chill shell 264 is raised up into position surrounding the heat set intermediate and the male mold. In a preferred embodiment, the chill shell 264 is machined to be approximately 0.010 inches from the exterior of the heat set container at all points and is maintained at a temperature that is less than the glass transition temperature of the material. At the same time that the chill shell is raised into place, the vacuum at the bottom of the container is released. Very shortly thereafter positive pressure is applied through port 260 to transfer the container from the male mold to the chill shell 264. During this process the dimensions of the container are slightly expanded as the container is still quite hot. Upon contact with the chill shell 264 the container cools rapidly and stiffens.

Figure 18D:
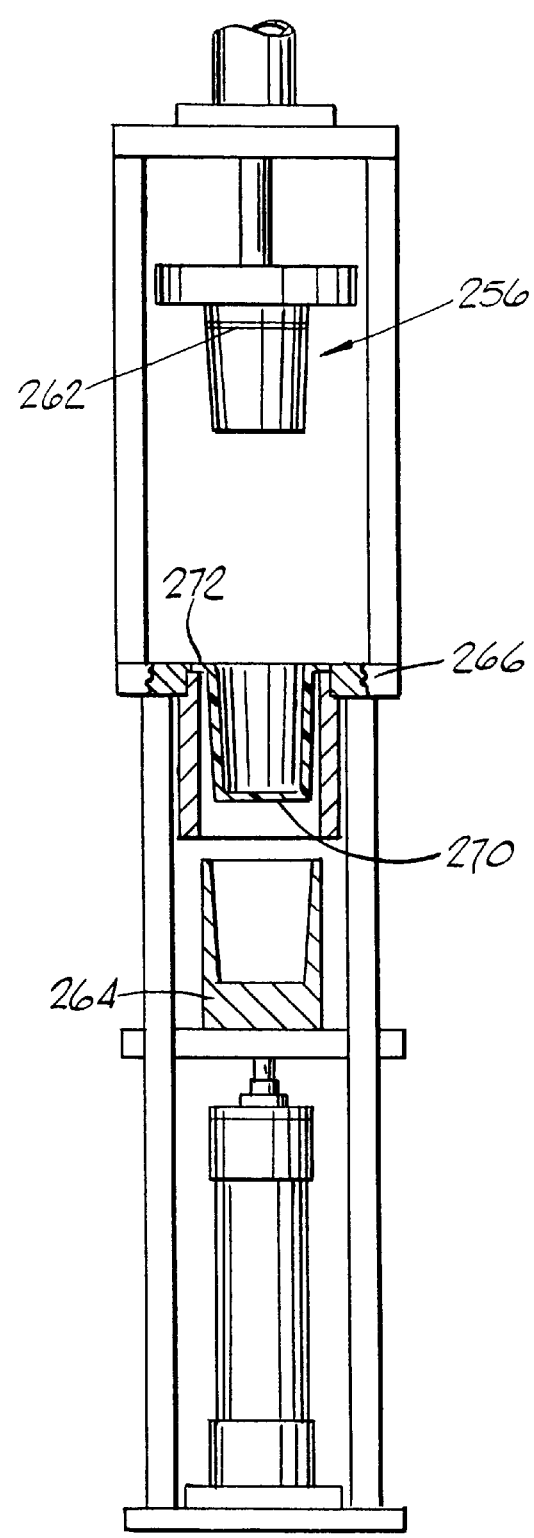

The male mold 256 is then raised and the container remains within the chill shell 264. And finally, and as is depicted in FIG. 18d, the chill shell 264 is lowered and the heat set container 270 is suspended by its rim 272 on the circular ledge 266.

Factors that effect the required time for heat shrinking/body setting include: 1) the type of thermoplastic used; 2) the sheet thickness; 3) the temperature of the heated male mold 256; 4) the temperature and the flow rate of the interior heated air; 5) the temperature and flow rate of the exterior heated air; and (6) the level of heat set required. For the level of heat set desired in preferred embodiments, when using pure PET or nucleated PET, the heated male mold 256 is held at 300–440° F., and the heated air internal and external, is held in about the same range. For optimal results, the intermediate is at about its orientation temperature (about 185–200° F.) when the heat setting cycle begins. Considering that the various parameters can be readily adjusted by one skilled in the art, the various steps depicted in FIGS. 18a–d can cumulatively be accomplished in as little as about 4.5 seconds.

Using the heat shrink/body set apparatus as depicted in FIGS. 17 and 18 and as described above, it is possible to create a container having different characteristics from the containers shown in FIGS. 3 and 13. Because of the superior heat shrinking that can be obtained using the heated mandrel and the heated air coupled with the high orientation achievable in the blow-forming step, it is possible to greatly increase the amount of shrinkage that an intermediate will undergo without creating visual imperfections in the final product.

As described above, due to the manner in which biaxially oriented intermediates are formed, the minimum depth of draw for a given material is relatively fixed. For example, for PET, to achieve an intermediate with fully oriented side walls the depth of draw must be at least about 1.3. The ability to produce a container having a final depth of draw of less than this is, therefore, a function of the amount of shrinkage that can occur during the heat shrinking step.

For example, a PET intermediate formed in the apparatus shown in FIG. 1, 2 or 12 will typically have a depth to diameter ratio of about 1.2–1.4. Utilizing this embodiment, such an intermediate may be placed on a male mold 256 in this embodiment dimensioned to yield a container with a depth to diameter of between 1.2 and 0.7.

The heat shrinking/body set apparatus shown in FIGS. 17 and 18 will form clear containers from intermediates whereby the volume of the formed container will be between 50% and 95% of the volume of the starting intermediate. Without the introduction of air, shrinkage to a volume of less than 75% would not be possible. Through this process, one can obtain a PET container having oriented, heat set and clear side walls and bottom with a depth to diameter ratio of less than 1.0. Further, these containers may have a translucent, heat set rim portion adjacent the mouth of the container. The biaxially oriented intermediate leading to this product need not be formed according to the teachings of this invention, but may be formed by any technique that yields an intermediate with sufficiently oriented side walls and bottom. The key to this embodiment is the improved heat shrinking/body setting afforded by the apparatus depicted in FIGS. 17 and 18, which allows a greater degree of volume reduction due to the heated male form and the introduction of air.

According to an embodiment of the present invention for the production of containers (including at least, beakers and food containers) the three processes of intermediate forming, rim heat setting, and heat shrinking may be accomplished by a single machine or apparatus having three discreet stations. (Of course, the rim heat setting station may be eliminated where non-heat set rims are desired.) In this manner, a sheet of thermoplastic will enter the machine and completed container will exit the machine. The first section of thermoplastic will enter the intermediate forming station and a plurality of biaxially oriented intermediates will be formed simultaneously while still existing as part of the sheet of thermoplastic. At this point the first section of thermoplastic is advanced to the rim setting station of the machine. While the biaxially oriented intermediates are rim set, a new set of intermediates are being formed in the first station. The sheet is then advanced again, and the rim heat set intermediates are advanced to the heat set station, the intermediates advance to the rim heat set station, and a new section of the thermoplastic sheet is at the intermediate forming station. The advancement continues with sheet coming into the machine and containers coming out the end. Cutting machines for separating the containers from the remainder of the sheet can be at a fourth station, or can be done at a different location or time. This process can also be extended further at the beginning as well. The machine may include means for taking the thermoplastic resin and extruding the sheet to be used in the process.

When operating under the following regime, the longest time for performing any of the steps dictates the overall rate of production of containers. It is critical, therefore, that the time for each station and process be minimized. Utilizing the apparatus and method as described above in conjunction with FIGS. 12–18, nucleated PET long drawn and short drawn containers can be produced with a rate limiting step, at most, of about 15 seconds. In a preferred embodiment for the production of long drawn or short drawn nucleated PET food containers, the rate limiting step is, at most, about 10 seconds.

The present invention most fundamentally combines two steps to create container shaped article. The two steps are the intermediate formation and heat shrink/body set stages. The combination of these steps, performed at separate stations, allows for the formation of container shaped articles that can not be produced via heretofore known means.

Blow forming to create the intermediate structure via traditional procedures is unacceptable. For PET, using these techniques it would be impossible to create intermediates having sufficient depth to diameter to be sufficiently oriented in the side walls to prevent whitening when heat setting, particularly near the rim. The problem being that in traditional blow forming the incipient intermediate sticks to the side wall of the forming tube and orientation is not uniform. The sticking on the side wall will cause the intermediate to be too thick and unoriented near the mouth of the intermediate and too thin near the bottom. The apparatus shown in FIGS. 1, 2 and 12 solve the sticking problem by the creation of an air cushion that, along with a non-stick coating on the walls, allows the formation of the intermediate.

Any process to make the intermediate using a plug to deform the thermoplastic sheet will give rise to an intermediate with different characteristics. The most significant difference is that when forming with a plug, particularly with the higher forces required to form the material at its orientation temperature, the use of a plug invariably tends to "scratch" the forming intermediate. These scratches will be seen in the final product, and will detract from the appearance of the otherwise transparent container.

EXAMPLE 2

In this example, a container of the type shown in FIG. 3, without the v-shaped depression in the rim, is produced utilizing the intermediate forming apparatus shown in FIG. 12, the rim setting apparatus shown in FIG. 15 and the heat shrinking/body set apparatus shown in FIGS. 17 and 18.

The starting material is nucleated PET sheet with a thickness of 0.040 inches. In the intermediate forming apparatus of FIG. 12, the upper clamping plate 300 is held at 203° F. and lower female forming tube 200 is maintained at 185° F. Room temperature sheet was placed into the apparatus and a vacuum was drawn through port 306 to draw the sheet into thermal contact with clamping plate 300 for 90 secs. (preheated sheet may be used, and this step may be eliminated). The vacuum to port 306 was then removed and air heated to approximately 200° F. was forced into the port to "blow" the sheet into the forming tube. The final pressure was about 50 p.s.i. and the forming time was less than 1.5 sec. Simultaneous to the application of air through port 306, air heated to about 200° F. was also forced through port 318 to provide the forming tube "air cushion." This air was controlled by a restriction valve fed by an 80 p.s.i. source.

After intermediate formation, the intermediate was transferred as quickly as possible to the rim setting apparatus as shown in FIG. 15. The upper rim set plate was maintained at 350° and the lower rim set plate was also maintained at 350° F. Rim heat setting proceeded for six seconds.

After rim heat setting the intermediate was transferred to the heat shrink/body set apparatus as shown in FIGS. 17 and 18.

In the heat shrink/body set stage the male mold and the air exiting the male mold at port 260 were held at 430° F. A pressure regulator held the maximum pressure at port 260 to 25 p.s.i. The surrounding cylinder and the exterior heated air were held at 400° F. Exterior heated air flow was about 2 SCFM. The chill shell was maintained at 100° F.

Figure 19:
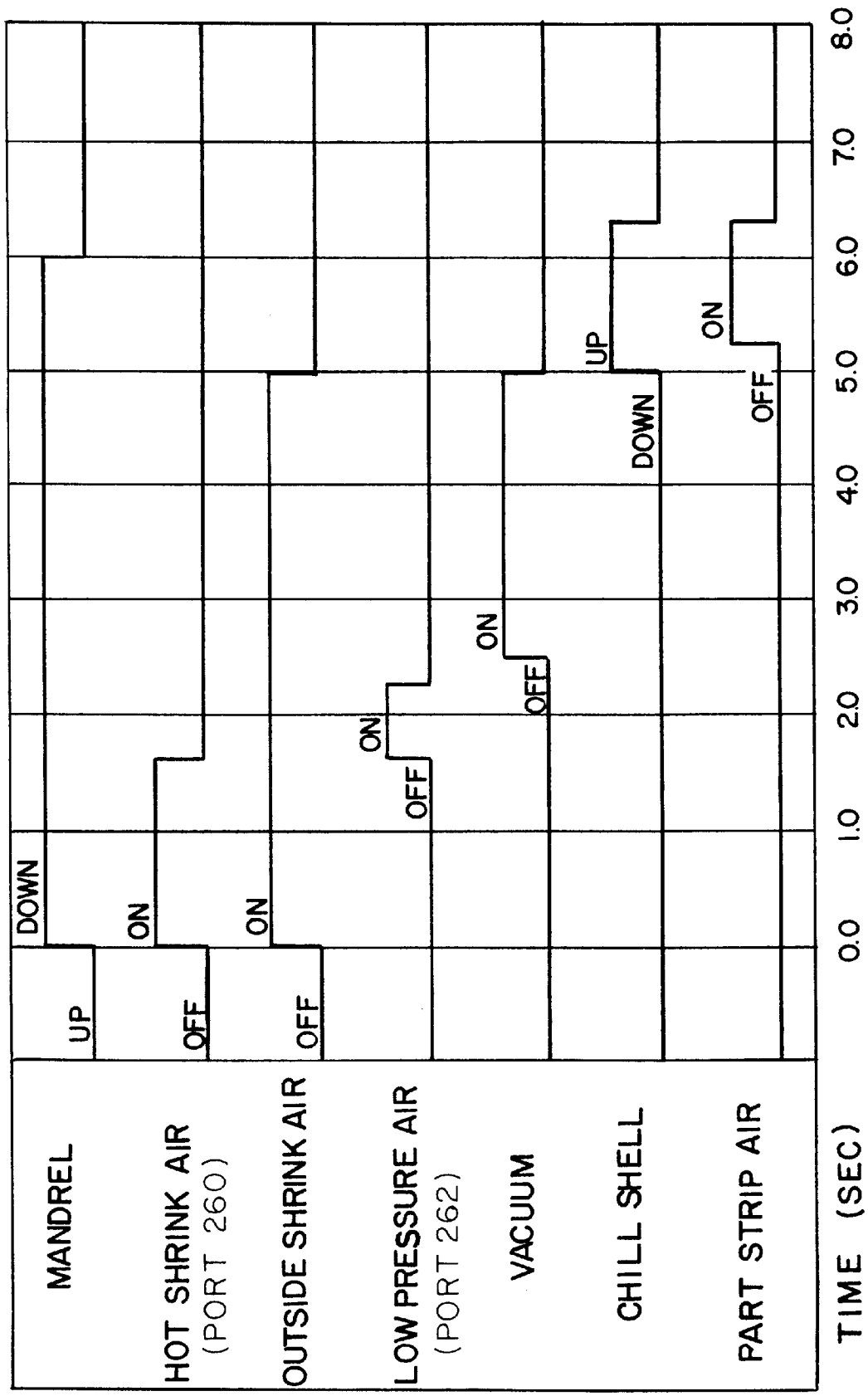
FIG. 19 describes the time regimes of an embodiment of the heat shrinking process of the invention utilizing the apparatus shown in FIG. 18.

A time schematic of the heat process is shown in FIG. 19. A total time of less than 7.0 seconds is used to take the rim heat set intermediate to the final formed container, i.e., to go from FIG. 18a to FIG. 18d. The final product has a side wall thickness of about 0.006–0.012 inches and a bottom thickness of about 0.006 inches. The final product is autoclaveable with less than 1% volumetric shrinkage.

The preceding explanation and the drawings included herewith are provided for purposes of illustrating the various principles of the present invention and are not intended, in any way, to diminish or limit the scope of the claims as set forth below.

What is claimed is:

1. A method for producing a biaxially oriented, open-ended container comprising:

forming a biaxially oriented intermediate by blow forming, without plug assist, into a forming tube a sheet of unoriented thermoplastic material that is maintained at or near its orientation temperature, wherein the depth of draw of said intermediate is sufficient for full orientation of the sidewalls;

placing said intermediate on a male form of a predetermined size, shape, and texture;

heating said intermediate above the orientation temperature of said thermoplastic material to heat-shrink said intermediate onto the surface of said form to create said container; and removing said container from said form.

* * * * *

UNITED STATES PATENT AND TRADEMARK OFFICE
CERTIFICATE OF CORRECTION

PATENT NO.    : 6,555,047 B1
DATED         : April 29, 2003
INVENTOR(S)   : Fortin It is certified that error appears in the above-identified patent and that said Letters Patent is hereby corrected as shown below:

<u>Title page,</u>
Under Item [57], ABSTRACT, "1 Claim, 10 Drawing Sheets" should read -- 2 Claims, 10 Drawing Sheets --

<u>Column 26,</u>
Lines 46-63, claim 1 should read:

> 1. A method for producing a biaxially oriented, transparent, thermoplastic, unitary open-ended container comprising:
> forming a biaxially oriented intermediate by blow forming, without plug assist, a sheet of thermoplastic material that is maintained at or near its orientation temperature;
> placing said intermediate on a male form of a predetermined size, shape and texture;
> heating said intermediate above the orientation temperature of said thermoplastic material to heat-shrink said intermediate onto the surface of said form to create said container; and
> removing said container from said form.

Line 64, claim 2 should read:

> 2. A method for blow forming a sheet of thermoplastic material to form a biaxially oriented container shaped article comprising:
> clamping said sheet of material over the mouth of a forming tube;
> heating said material to about its orientation temperature; and
> applying fluid pressure to the face of said sheet in order to cause said sheet to enter into and substantially conform to the interior shape of said forming tube to create said biaxially oriented article.

Signed and Sealed this

Thirtieth Day of September, 2003

JAMES E. ROGAN
*Director of the United States Patent and Trademark Office*